(12) United States Patent  
Kishimoto et al.

(10) Patent No.: US 12,060,207 B2  
(45) Date of Patent: Aug. 13, 2024

(54) BARRIER LAMINATE FILM, AND PACKAGING MATERIAL WHICH USES BARRIER LAMINATE FILM

(71) Applicant: DAI NIPPON PRINTING CO., LTD., Tokyo (JP)

(72) Inventors: Yoshihiro Kishimoto, Tokyo (JP); Azusa Suzuki, Tokyo (JP); Kanari Aono, Tokyo (JP); Yasunari Iio, Tokyo (JP); Shohei Itami, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 42 days.

(21) Appl. No.: 16/981,201

(22) PCT Filed: Mar. 20, 2019

(86) PCT No.: PCT/JP2019/011720  
§ 371 (c)(1),  
(2) Date: Sep. 15, 2020

(87) PCT Pub. No.: WO2019/182017  
PCT Pub. Date: Sep. 26, 2019

(65) Prior Publication Data  
US 2020/0407136 A1  Dec. 31, 2020

(30) Foreign Application Priority Data

Mar. 22, 2018 (JP) .................................. 2018-053794  
Sep. 28, 2018 (JP) .................................. 2018-186137

(51) Int. Cl.  
*B65D 65/42* (2006.01)  
*B32B 27/08* (2006.01)  
(Continued)

(52) U.S. Cl.  
CPC .............. *B65D 65/42* (2013.01); *B32B 27/08* (2013.01); *B32B 27/36* (2013.01); *B65D 65/40* (2013.01);  
(Continued)

(58) Field of Classification Search  
None  
See application file for complete search history.

(56) References Cited

U.S. PATENT DOCUMENTS 5,302,368 A * 4/1994 Harato .................... C01F 7/023  
501/153  
6,841,497 B1 * 1/2005 Krell .................. C04B 41/5031  
427/457

(Continued)

FOREIGN PATENT DOCUMENTS

EP  1 787 796  5/2007  
EP  2 799 589  11/2014  
(Continued)

OTHER PUBLICATIONS

"Aluminum Oxide (Alumina), Hydrated" Kirk-Othmer Encyclopedia of Chemical Technology, John Wiley & Sons, Inc. 2003 (Year: 2003).*

(Continued)

*Primary Examiner* — Vivian Chen  
(74) *Attorney, Agent, or Firm* — HSML P.C.

(57) ABSTRACT

Provided are: a laminate film which is equipped with a vapor-deposited aluminum oxide film exhibiting high barrier performance and excellent so-called retort resistance, and also exhibits favorable adhesion between the vapor-deposited aluminum oxide film and a plastic substrate even after undergoing a hydrothermal treatment; a barrier laminate film containing the laminate film; and a barrier packaging material which uses the barrier laminate film. A (Continued)

laminate film exhibiting improved adhesion strength and barrier performance, wherein: a transition region prescribing adhesion strength is formed between the surface of the substrate film and the vapor-deposited film which primarily comprises the formed vapor-deposited aluminum oxide film, by subjecting the vapor-deposited aluminum oxide film of the laminate film to a time-of-flight secondary ion mass spectrometry (TOF-SIMS) method using a Cs (cesium) ion gun; the transition region contains elementally bonded $Al_2O_4H$, which can be modified into aluminum hydroxide which can be detected by etching using TOF-SIMS; and the rate of modification in the transition region into aluminum hydroxide, which is defined as the ratio of the modified transition region to the vapor-deposited aluminum oxide film specified by carrying out etching using TOF-SIMS, is prescribed to be 5-60%, inclusive.

18 Claims, 6 Drawing Sheets

(51) Int. Cl.

| | | |
|---|---|---|
| B32B 27/36 | (2006.01) | |
| B65D 65/40 | (2006.01) | |
| C08J 7/04 | (2020.01) | |
| C08J 7/043 | (2020.01) | |
| C08J 7/048 | (2020.01) | |
| C08J 7/06 | (2006.01) | |
| C08J 7/12 | (2006.01) | |
| C23C 18/20 | (2006.01) | |
| C23C 18/22 | (2006.01) | |

(52) U.S. Cl.
CPC ............ *C08J 7/06* (2013.01); *B32B 2255/10* (2013.01); *B32B 2255/20* (2013.01); *B32B 2307/31* (2013.01); *B32B 2553/00* (2013.01); *C08J 7/042* (2013.01); *C08J 7/0423* (2020.01); *C08J 7/043* (2020.01); *C08J 7/048* (2020.01); *C08J 7/123* (2013.01); *C08J 2367/02* (2013.01); *C23C 18/2026* (2013.01); *C23C 18/22* (2013.01)

(56) References Cited

U.S. PATENT DOCUMENTS

| | | | | |
|---|---|---|---|---|
| 11,655,087 | B2* | 5/2023 | Kishimoto | B32B 15/04 428/35.7 |
| 2004/0166322 | A1* | 8/2004 | Suzuki | C04B 35/10 428/411.1 |
| 2010/0239852 | A1* | 9/2010 | Okuzu | C09D 7/62 524/502 |
| 2012/0288693 | A1* | 11/2012 | Stanley | B32B 27/34 428/220 |
| 2013/0011631 | A1* | 1/2013 | Sakellarides | B29C 48/21 428/458 |
| 2014/0099455 | A1* | 4/2014 | Stanley | B32B 27/36 428/34.3 |
| 2014/0311409 | A1* | 10/2014 | Asuma | H01J 37/3277 118/718 |
| 2015/0275349 | A1* | 10/2015 | Matsui | B32B 7/12 428/200 |
| 2015/0321819 | A1* | 11/2015 | Araki | B31B 70/60 206/484 |
| 2021/0002050 | A1* | 1/2021 | Kishimoto | B32B 27/08 |

FOREIGN PATENT DOCUMENTS

| | | | |
|---|---|---|---|
| JP | S 63-222849 A | * | 9/1988 |
| JP | H 05-009709 A | * | 1/1993 |
| JP | H7-233463 | | 9/1995 |
| JP | 2000-043182 | | 2/2000 |
| JP | 2005-335109 | | 12/2005 |
| JP | 2007-210262 | | 8/2007 |
| JP | 4135496 | | 8/2008 |
| JP | 4461737 | | 5/2010 |
| JP | 2011-042147 | | 3/2011 |
| JP | 2012-096469 | | 5/2012 |
| JP | 2013-082106 | | 5/2013 |
| JP | 2020-044708 | | 3/2020 |
| JP | 2020-049941 | | 4/2020 |
| JP | 2020-049942 | | 4/2020 |
| WO | 03/009998 | | 2/2003 |
| WO | 2013/100073 | | 7/2013 |
| WO | 2014/050951 | | 4/2014 |
| WO | WO 2018/181405 A | * | 10/2018 |
| WO | 2019/087960 | | 5/2019 |
| WO | WO 2019/189490 A | * | 10/2019 |
| WO | WO 2019/087960 A | * | 11/2020 |

OTHER PUBLICATIONS

JP 63-222849 A (Watanabe et al.) (published Sep. 16, 1988) (full English translation). (Year: 1988).*
JP 2019-142522 A (Sugiyama et al.) (published Aug. 29, 2019) (machine translation) (Year: 2019).*
Office Action issued for Chinese Patent Application No. 201980019890.1, Dec. 22, 2021, 20 pages including.
International Search Report and Written Opinion of PCT/JP2019/011720, Jun. 11, 2019, 10 pages including English translation of International Search Report.
Scott, Jill R. et al., "Experimental and Computational Study of Hydration Reactions of Aluminum Oxide Anion Clusters", The Journal of Physical Chemistry A, vol. 104, No. 30, Aug. 1, 2000, pp. 7079-7090.
The extended European Search Report of European patent application No. 19771794.5, May 10, 2021, 8 pages.
International Preliminary Report on Patentability of PCT/JP2019/011720, Oct. 1, 2020, 8 pages.
Office Action issued for Chinese Patent Application No. 201980019890.1, Aug. 12, 2022, 20 pages including English translation.
Office Action issued for Japanese Patent Application No. 2020-507875, Nov. 22, 2022, 6 pages including machine translation.
Office Action issued for Chinese Patent Application No. 201980019890.1, Feb. 28, 2023, 6 pages including machine translation.

* cited by examiner

[Fig. 1]
(a)
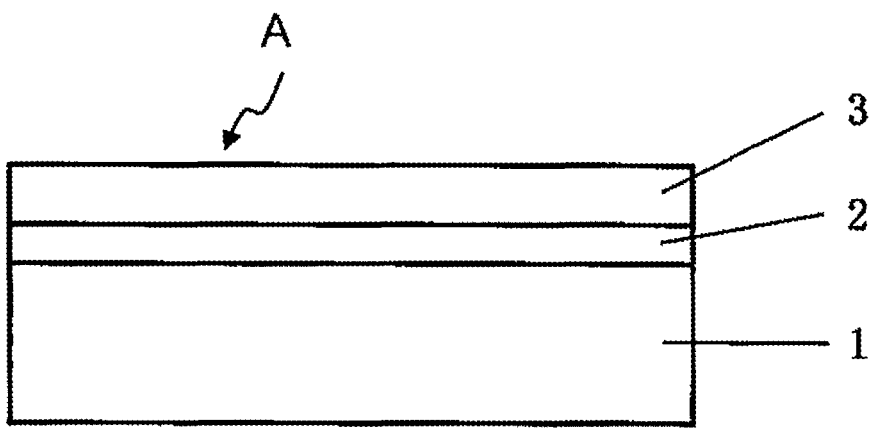
(b)
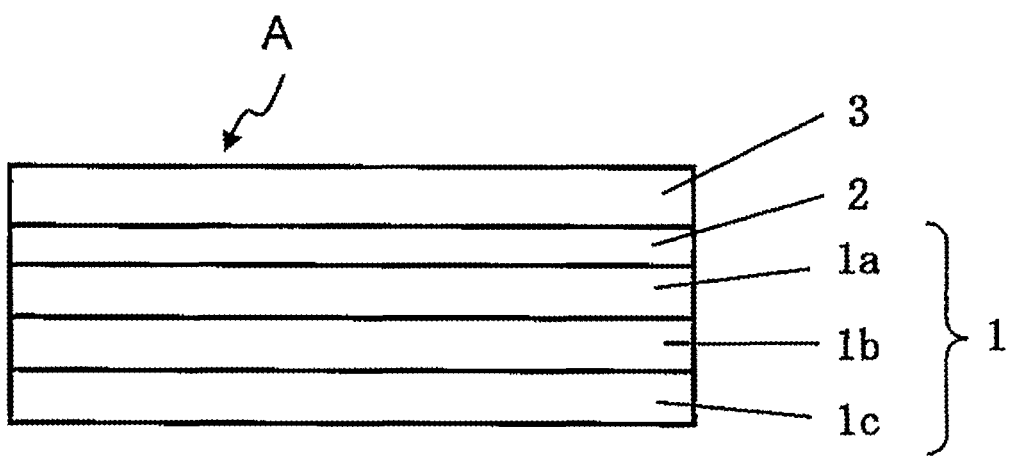

[Fig. 2]
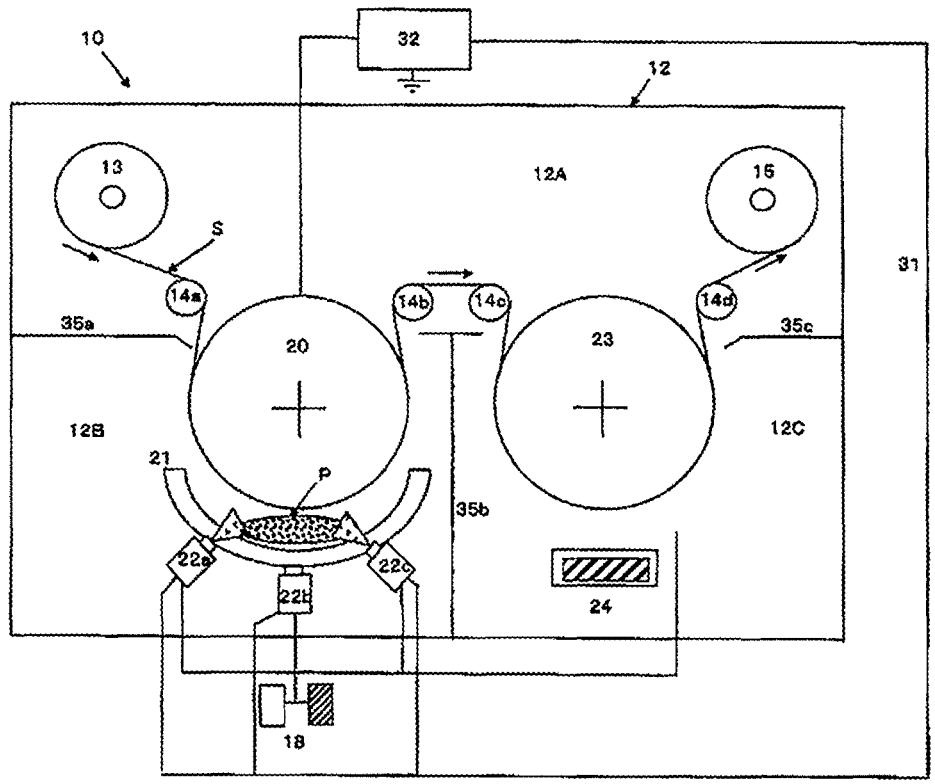
[Fig. 3]
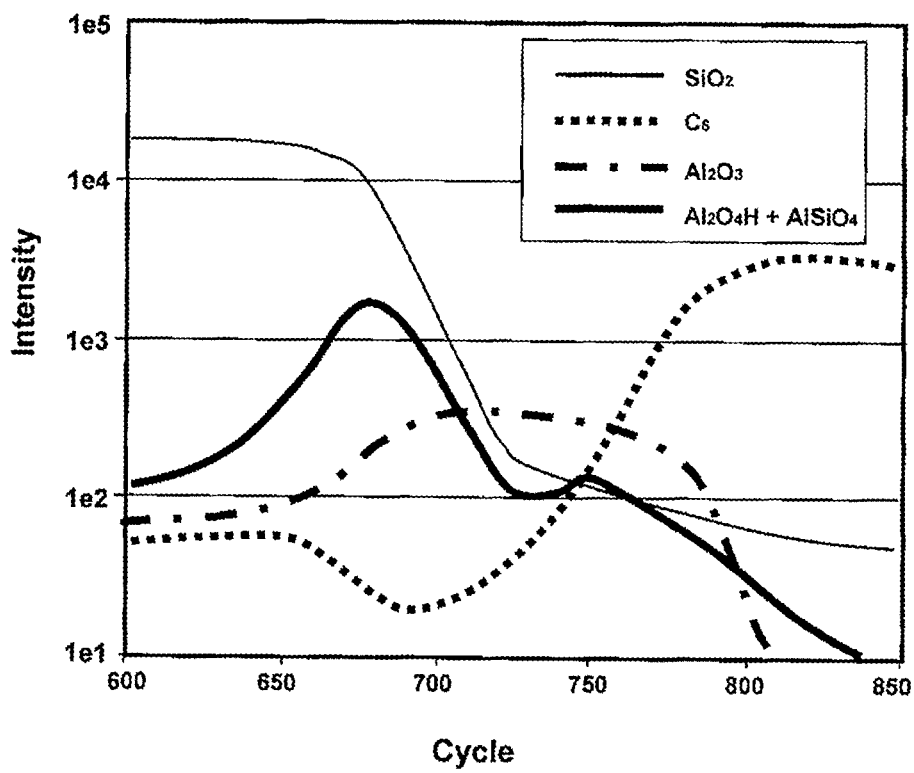

[Fig. 4]
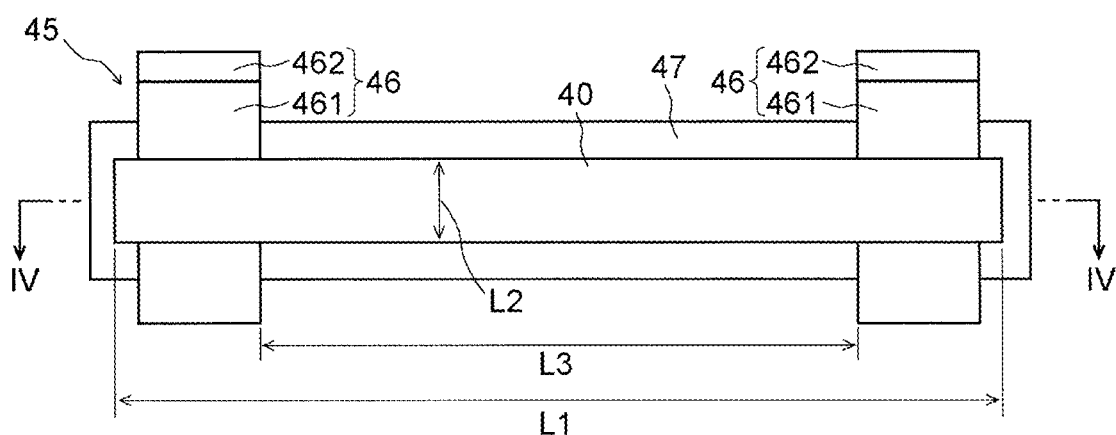
[Fig. 5]
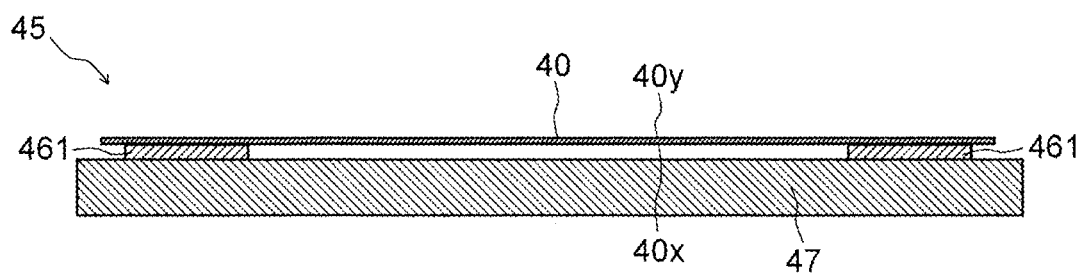

[Fig. 6]
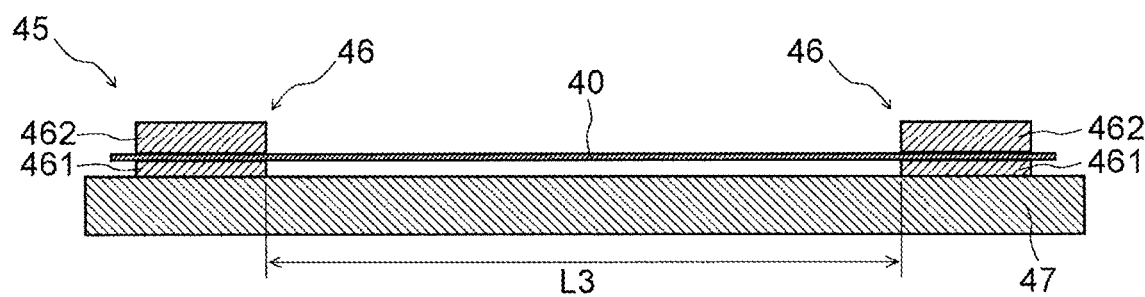
[Fig. 7]
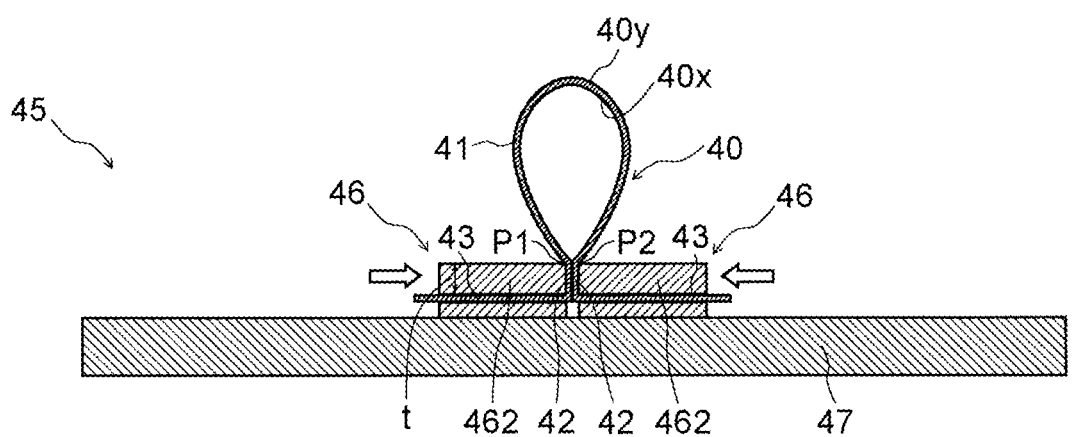

[Fig. 8]
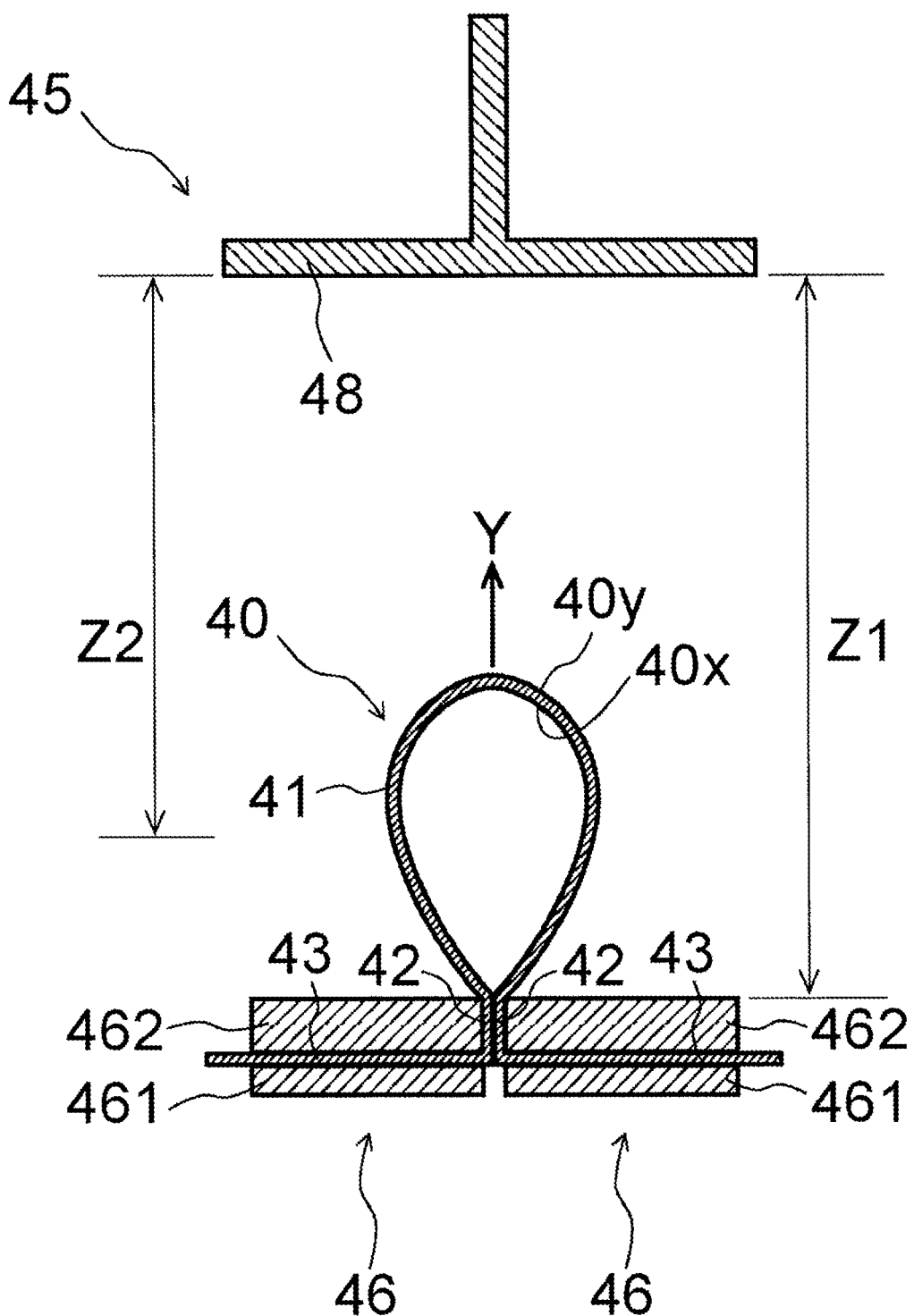

[Fig.9]
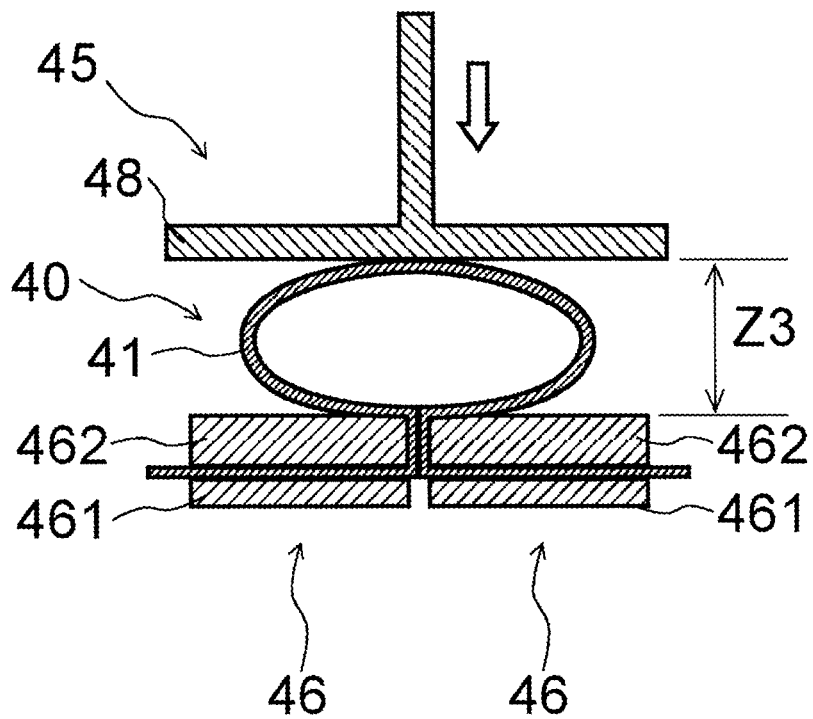
[Fig. 10]
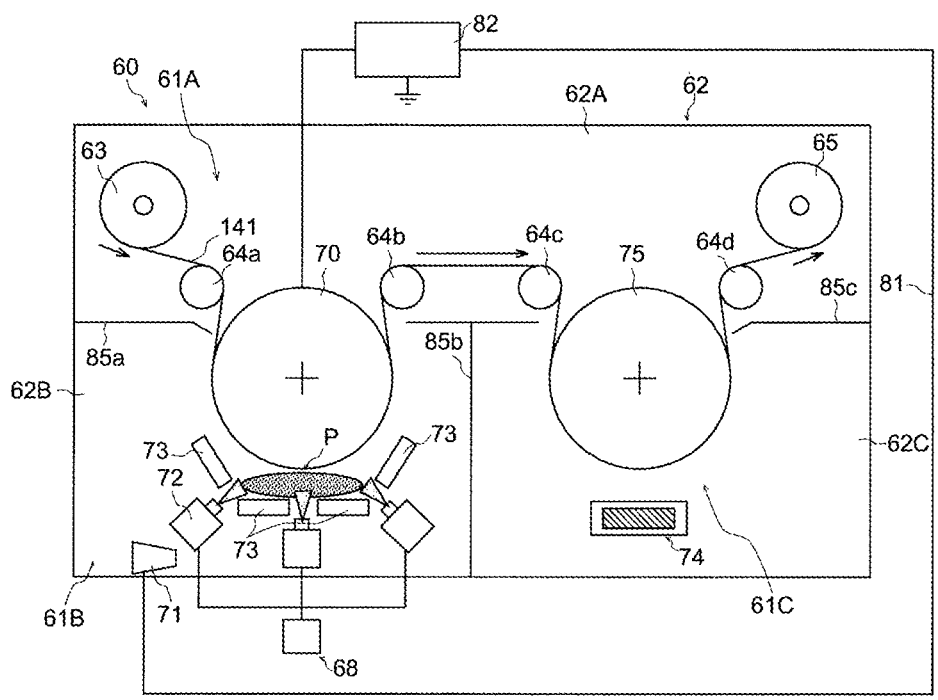

BARRIER LAMINATE FILM, AND PACKAGING MATERIAL WHICH USES BARRIER LAMINATE FILM

TECHNICAL FIELD

The present invention relates to a barrier laminate film and a packaging material having a barrier property and retort resistance that can be suitably used as a packaging material for food, drugs and pet food to be subjected to a retort treatment, are excellent in barrier properties against oxygen and steam, and are improved in adhesiveness between a plastic substrate and an aluminum oxide deposited film after the retort treatment.

BACKGROUND ART

In the field requiring a retort treatment of food, drugs and the like, in order to prevent change of the quality of a content as well as retain the function and properties, a barrier laminate film that is not affected by temperature and humidity and is capable of stably exhibiting a higher barrier property is required, and a barrier laminate film having a layered structure in which a barrier layer of a thin deposited film of silicon oxide, aluminum oxide or the like and a barrier coating layer are laminated has been developed.

A plastic substrate of a laminate film including a deposited film easily affected by temperature and humidity and having an excellent barrier property is, however, easily changed in dimension, and therefore, it is difficult for a deposited film provided thereon, such as a silicon oxide deposited film or an aluminum oxide deposited film, to follow expansion/shrinkage accompanying the dimensional change of the plastic substrate.

Therefore, an interlayer peeling phenomenon occasionally occurs under a severe environment of high temperature and high humidity in an interlayer portion between the plastic substrate and the deposited film of a silicon oxide deposited film or an aluminum oxide deposited film, and further, a crack, a pinhole or the like is formed.

As a result, original barrier performance is conspicuously damaged, and there arises a problem that the barrier performance is very difficult to retain.

In employing the method using the deposited film, when a deposited film of an inorganic oxide such as aluminum oxide is formed on a plastic substrate, in order to obtain high adhesiveness between the plastic substrate and the deposited film formed thereon, a method for modifying a surface of the plastic substrate, such as an in-line plasma pretreatment using a parallel plate apparatus, or formation of an undercoat treatment layer, is performed (see, for example, Patent Literature 1 and Patent Literature 2).

In the in-line plasma treatment method using a generally used parallel plate apparatus described in Patent Literature 1, however, a functional group such as a hydroxyl group or a carbonyl group is introduced onto a plastic surface to attain adhesiveness to the deposited film via the functional group. When the adhesiveness is attained through a hydrogen bond using a hydroxyl group, however, there arises a problem that the adhesiveness is conspicuously deteriorated under a high temperature and high humidity environment required in application to an electronic device such as electronic paper or a retort packaging material because the hydrogen bond is broken under such an environment.

Besides, in the plasma treatment, a film is merely allowed to pass through an atmosphere of plasma generated in the air, and hence, sufficient adhesiveness under the severe environment of high temperature and high humidity or the like is not actually obtained between the substrate and the deposited film.

Besides, in the undercoat treatment method described in Patent Literature 2, an undercoat layer is provided on a surface of a plastic film as an adhesion layer, and although generally performed, this method increases cost because the number of procedures in the production is increased.

As a countermeasure, a technique for improving adhesiveness by subjecting a plastic substrate surface to a pretreatment by a reactive ion etching (RIE) method in which plasma is generated with an electrode for plasma generation provided on a side of the substrate is performed (Patent Literature 3).

The plasma RIE method simultaneously attains two effects of a chemical effect of imparting a functional group onto the substrate surface, and a physical effect of smoothing the surface by removing impurities and the like by ion etching, and thus, adhesiveness is attained.

In the RIE method, the adhesiveness is not attained by using a hydrogen bond differently from the in-line plasma treatment, and therefore, deterioration of the adhesiveness under a high temperature and high humidity environment is not caused.

In the RIE method, however, since a functional group is imparted onto the plastic substrate, water resistance and hot water resistance causing hydrolysis on the interface are still insufficient. Besides, in order to obtain sufficient adhesiveness by the RIE method, an Ed value (=plasma density× treatment time) equal to or larger than a prescribed value is necessary.

In order to obtain an Ed value equal to or larger than the prescribed value in this method, a method of increasing a plasma density or a method of increasing the treatment time may be employed, but when the plasma density is increased, a high output power supply is necessary, which causes a problem of large damage of the substrate, and when the treatment time is increased, there arises a problem of deterioration of productivity (see Patent Literature 4 and Patent Literature 5).

Accordingly, there is a demand for a laminate film that solves the problems occurring in forming a deposited film of an inorganic oxide on a surface of a plastic substrate to be conveyed as described above, has good adhesiveness between the plastic substrate and the deposited film even after a retort treatment, and is excellent in a barrier property.

In particular, in the field requiring a retort treatment and disinfection for food, drugs and the like performed at a high temperature and a high pressure, there is a demand for a barrier laminate film that is not affected by temperature and humidity, and is capable of stably exhibiting a higher barrier property so as to prevent change of the quality of a content and retain the function and properties, and a barrier laminate film that has a layered structure in which a barrier layer of a thin film of silicon oxide or aluminum oxide and a barrier coating layer are laminated, and is excellent in retort resistance is desired.

CITATION LIST

Patent Literature

[Patent Literature 1] Japanese Patent Laid-Open No. 7-233463
[Patent Literature 2] Japanese Patent Laid-Open No. 2000-43182

[Patent Literature 3] Japanese Patent Laid-Open No. 2005-335109
[Patent Literature 4] Japanese Patent No. 4461737
[Patent Literature 5] Japanese Patent No. 4135496

SUMMARY OF INVENTION

Technical Problem

In the problems of conventional techniques, large mechanical and chemical stress is applied to an interface between a plastic substrate and an aluminum oxide deposited film through a retort treatment by a hot water treatment. This stress deteriorates the barrier property. The stress is applied to this portion because this portion is the most fragile portion in a layered structure. In order to obtain retort resistance, it is significant to rigidly coat the deposited film on the interface with the substrate.

On the other hand, aluminum hydroxide is good in adhesiveness to a plastic substrate owing to the chemical structure, and forms a network by itself and hence is dense, and therefore has a high steam barrier property. In a severe environment as in a retort treatment, however, a bond structure based on a hydrogen bond between aluminum hydroxide and the substrate easily microscopically collapses. Besides, the network of aluminum hydroxide easily permeates into a film due to affinity on a grain boundary between a water molecule and aluminum hydroxide.

The present invention was devised in consideration of the problems and findings described above, and an object is to provide a laminate film that has good adhesiveness between a plastic substrate and an aluminum oxide deposited film even after a hot water treatment, and includes a deposited film having an excellent barrier property, a barrier laminate film including the laminate film and including the aluminum oxide deposited film excellent in what is called retort resistance, and a packaging material excellent in adhesiveness and a barrier property and having excellent retort resistance using the barrier laminate film.

Solution to Problem

In order to achieve these objects, a laminate film of the present invention is a laminate film having a barrier property including an aluminum oxide deposited film containing aluminum oxide as a principal component and formed on a surface of a plastic substrate. A transition region of the deposited film regulating adhesion strength between the substrate film surface and the formed deposited film principally including the aluminum oxide is formed, the transition region contains an elemental bond $Al_2O_4H$ transformed to aluminum hydroxide and detected by etching by time-of-flight secondary ion mass spectrometry (TOF-SIMS), and a transformation ratio of the transition region defined by a ratio of a transformed portion of the transition region regulated by TOF-SIMS to the aluminum oxide deposited film regulated by the etching by TOF-SIMS is 5% or more and 60% or less.

Secondary ion mass spectrometry (SIMS) is a method for analyzing an element concentration distribution in which a mass of secondary ions sputtered and released from a surface of an analysis sample through irradiation of the sample with a primary ion beam. In this secondary ion mass spectrometry, secondary ion intensity is detected while sputtering is proceeding. Accordingly, in time-shift data of ion intensity of the secondary ion, namely, an ion of an element to be detected or a molecular ion bonded to the element to be detected, transition time is converted into a depth, and thus, a concentration distribution of the element to be detected in the depth direction from the sample surface can be grasped.

In the present invention, for the conversion of transition time into a depth, the depth of a dent formed on the sample surface through the irradiation with primary ions is measured by using a surface roughness meter, an average sputtering rate is calculated based on the depth of the dent and the transition time, and assuming that the sputtering rate is constant, irradiation time (namely, the transition time) is converted into the depth (sputtered amount).

In the present invention, with the aluminum oxide deposited film of the laminate film repeatedly soft etched using a Cs (cesium) ion gun at the constant rate, an ion derived from the aluminum oxide deposited film and an ion derived from the plastic substrate are measured by time-of-flight secondary ion mass spectrometry (TOF-SIMS), and thus, the transition region regulating the adhesion strength is formed between the substrate film surface and the formed deposited film principally including the aluminum oxide. The transition region contains the elemental bond $Al_2O_4H$ transformed to aluminum hydroxide and detected by etching by time-of-flight secondary ion mass spectrometry (TOF-SIMS), and it has been found that when the transformation ratio of the transition region defined by a ratio of a portion of the transition region transformed to aluminum hydroxide regulated by time-of-flight secondary ion mass spectrometry to the aluminum oxide deposited film regulated by etching by time-of-flight secondary ion mass spectrometry is specified, a barrier laminate film having improved adhesion strength can be specified.

Specifically, according to the present invention, etching is performed with Cs from an outermost surface of an aluminum oxide deposited film by using a time-of-flight secondary ion mass spectrometer, elemental bonds on an interface between the aluminum oxide deposited film and a plastic substrate and elemental bonds in the deposited film are measured, and actually measured graphs of elements and elemental bonds thus measured are obtained (FIG. 3, analytic graph). Then, in order to make as narrow as possible a transition region formed by aluminum hydroxide in the aluminum oxide deposited film on the interface between the plastic substrate and the deposited film, taking note of an elemental bond $Al_2O_4H$, the following is performed: 1) A position on a graph of an element $C_6$ where the intensity becomes a half is obtained as the interface between the plastic substrate and aluminum oxide, and a portion from the surface to the interface is obtained as the aluminum oxide deposited film, 2) a peak on a graph corresponding to the elemental bond $Al_2O_4H$ is obtained, and a portion from the peak to the interface is defined and obtained as the transition region, and 3) a transformation ratio of the transition region to aluminum hydroxide is obtained by (transition region from peak of elemental bond $Al_2O_4H$ to interface/aluminum oxide deposited film)×100(%).

According to the present invention, since the transformation ratio of the transition region of the aluminum oxide deposited film is specified as 5% or more and 60% or less, adhesion intensity on the interface of a barrier coating layer further formed in the laminate film with the plastic substrate and the aluminum oxide deposited film of the barrier laminate film can be set to 2.1 N/15 mm or more even after a hot water treatment at 135° C. for 40 minutes (high retort treatment), or even after a hot water treatment at 121° C. for 40 minutes (semi retort treatment). As a result, a barrier laminate film that is free from delamination otherwise caused in molding into a retort pouch or in retort processing, is improved in adhesiveness, and has retort resistance can be produced.

According to the present invention, since the transformation ratio of the transition region of the aluminum oxide deposited film is specified as 5% or more and 60% or less, a barrier laminate film having oxygen permeability and steam permeability after a high retort treatment and semi retort treatment of respectively 0.2 cc/m$^2$/24 hr or less and 0.9 g/m$^2$/24 hr or less, and having a barrier property sufficient for preventing quality deterioration of a content after the retort treatment and preventing deterioration of shelf life can be produced.

Accordingly, the aluminum oxide deposited film of the present invention can improve the adhesiveness on the interface with the plastic substrate, and in addition, as for the barrier performance, is excellent in moist heat resistance and hot water resistance after a retort treatment, and can improve the retort resistance.

The present invention has the following characteristics:

1. A barrier laminate film, including an aluminum oxide deposited film containing aluminum oxide as a principal component and formed on a surface of a plastic substrate, and a barrier coating layer formed on a surface of the aluminum oxide deposited film, wherein a transition region regulating adhesion strength between the surface of the plastic substrate and the aluminum oxide deposited film is formed in the aluminum oxide deposited film, the transition region contains an elemental bond Al$_2$O$_4$H detected by etching by time-of-flight secondary ion mass spectrometry (TOF-SIMS) and transformed to aluminum hydroxide, and a transformation ratio of the transition region defined as a ratio of a transformed portion of the transition region regulated by TOF-SIMS to the aluminum oxide deposited film regulated by etching the barrier coating layer and the aluminum oxide deposited film by TOF-SIMS is 5% or more and 60% or less.

2. The barrier laminate film according to 1 above, wherein the plastic substrate is a polyethylene terephthalate film.

3. The barrier laminate film according to 1 above, wherein the plastic substrate contains a recycled polyethylene terephthalate film.

4. The barrier laminate film according to 1 above, wherein the plastic substrate is a polybutylene terephthalate film.

5. The barrier laminate film according to 1 above, wherein the plastic substrate is a biomass-derived polyester film.

6. The barrier laminate film according to 1 above, wherein the plastic substrate is a high stiffness PET film.

7. The barrier laminate film according to any of 1 to 6 above, wherein the surface of the plastic substrate is an oxygen plasma treated surface.

8. The barrier laminate film according to 7 above, wherein the aluminum oxide deposited film is laminated in-line on the oxygen plasma treated surface.

9. The barrier laminate film according to any of 1 to 8 above, wherein the barrier coating layer is a layer formed by applying a mixed solution of a metal alkoxide and a water-soluble polymer, and drying the applied solution by heating.

10. The barrier laminate film according to any of 1 to 9 above, wherein the barrier coating layer is a layer formed by applying a mixed solution of a metal alkoxide, a silane coupling agent and a water-soluble polymer, and drying the applied solution by heating.

11. A packaging material, including the barrier laminate film according to any of 1 to 10 above, and a heat-sealable thermoplastic resin laminated on the barrier laminate film.

12. The packaging material according to 11 above, used for packaging for retort sterilization.

Advantageous Effects of Invention

In the present invention, in order to make as narrow as possible a transition region, where aluminum hydroxide is formed, on an interface of an aluminum oxide deposited film with a plastic substrate for adjusting a ratio of modification to aluminum hydroxide, taking note of an elemental bond Al$_2$O$_4$H, a transformation ratio of the transition region of the aluminum oxide deposited film in a laminate film is specified as 60% or less. Thus, a ratio of an aluminum oxide film containing a relatively small amount of aluminum hydroxide is increased, so as to greatly suppress microscopic destruction of the deposited film caused by a water molecule through a retort treatment, and destruction of the interface with the plastic substrate. As a result, the adhesiveness is improved, and hence a laminate film having unprecedented retort resistance, and a barrier laminate film including the laminate film can be provided. On the other hand, when there is substantially no aluminum hydroxide in the vicinity of the interface with the plastic substrate, a dense aluminum oxide film cannot be formed but a film with a poor steam barrier property is formed, and hence the transformation ratio is specified as 5% or more.

The barrier laminate film of the present invention has adhesion strength on the interface between the plastic substrate and the aluminum oxide deposited film of 2.1 N/15 mm or more even after a high retort treatment or a semi retort treatment, has such a barrier property that oxygen permeability and steam permeability after the high retort treatment and the semi retort treatment are respectively 0.2 cc/m$^2$/24 hr or less and 0.9 g/m$^2$/24 hr or less, and thus, is excellent in retort resistance.

BRIEF DESCRIPTION OF DRAWINGS

FIG. 1 is a cross-sectional view illustrating a barrier laminate film A in which a barrier coating layer of the present invention is laminated (FIG. 1a) and an example of a barrier laminate film A of another aspect (FIG. 1b).

FIG. 2 is a diagram illustrating an example of an apparatus for forming an aluminum oxide deposited film of the present invention.

FIG. 3 illustrates an example of an analytic graph of analysis results, obtained by time-of-flight secondary ion mass spectrometry, of a laminate film of the present invention including an aluminum oxide deposited film in which a barrier coating layer is laminated.

FIG. 4 is a plan view illustrating an example of a loop stiffness measuring device.

FIG. 5 is a cross-sectional view taken on line IV-IV of the loop stiffness measuring device of FIG. 4.

FIG. 6 is a diagram explaining a step of attaching a test piece onto the loop stiffness measuring device.

FIG. 7 is a diagram explaining a step of forming a loop portion in the test piece.

FIG. 8 is a diagram explaining a step of applying a load to the loop portion of the test piece.

FIG. 9 is a diagram explaining the step of applying a load to the loop portion of the test piece.

FIG. 10 is a diagram illustrating an example of another aspect of the apparatus for forming the aluminum oxide deposited film of the present invention.

DESCRIPTION OF EMBODIMENTS

Now, a barrier laminate film having improved adhesiveness according to an embodiment of the present invention will be described in detail with reference to the accompanying drawings. It is noted that this embodiment is merely illustrative and does not limit the present invention at all.

FIG. 1a is a cross-sectional view illustrating an example of a barrier laminate film of the present invention, FIG. 1b is a cross-sectional view illustrating an example of a laminate film in which a substrate layer includes multiple layers, and FIG. 2 is a diagram schematically illustrating the structure of a roller-type continuous deposited film-forming apparatus suitably used for forming an aluminum oxide deposited film of a barrier laminate film of the present invention. Incidentally, in order to form a barrier coating layer, a barrier coating agent application device is formed continuously to the deposited film-forming apparatus, but is not illustrated in the drawing because a merely known roller application device is consecutively provided.

A barrier laminate film A according to the present invention including an aluminum oxide deposited film having improved adhesiveness and a barrier property and a barrier coating layer has a multilayer structure, as a basic structure, as illustrated in FIG. 1a, in which an aluminum oxide deposited film 2 having improved adhesiveness and a barrier property is laminated on one surface of a plastic substrate 1, and a barrier coating layer 3 is further laminated on the aluminum oxide deposited film 2, and is excellent in adhesiveness and a barrier property, and excellent in retort resistance.

The plastic substrate is not especially limited, and any of known plastic films and sheets can be used. For example, a film of a polyester-based resin such as polyethylene terephthalate, biomass-derived polyester, polybutylene terephthalate, polyethylene naphthalate, or recycled polyethylene terephthalate, a polyamide-based resin such as polyamide resin 6, polyamide resin 66, polyamide resin 610, polyamide resin 612, polyamide resin 11, or polyamide resin 12, or a polyolefin-based resin such as a polymer of an α-olefin polymer like polyethylene or polypropylene can be used. A polyester-based resin known as a polyethylene terephthalate film is particularly preferably used.

(Polybutylene Terephthalate Film (PBT))

Since a polybutylene terephthalate film has a high heat distortion temperature, is excellent in mechanical strength and electric characteristics, and is good at moldability, when it is used for a packaging bag for holding a content of food or the like, it is possible to suppress deformation of the packaging bag and deterioration of the strength in performing a retort treatment.

The polybutylene terephthalate film has high strength. Therefore, when the polybutylene terephthalate film is used, piercing resistance can be imparted to the packaging bag in the same manner as in a case where a packaging material forming the packaging bag includes a nylon film.

Besides, the polybutylene terephthalate film hydrolyzes under a high temperature and high humidity environment to degrade in adhesion strength and a barrier property after a retort treatment, but has a property of less absorbing moisture than nylon. Therefore, even when the polybutylene terephthalate film is formed on an outer surface of a packaging material, deterioration in laminate strength between packaging materials of the packaging bag can be suppressed. Owing to these characteristics, the polybutylene terephthalate film is preferably used for a retort packaging bag because such a packaging bag can be used instead of a conventional laminated packaging material of a polyethylene terephthalate film and a nylon film.

The polybutylene terephthalate film is a film containing, as a principal component, polybutylene terephthalate (hereinafter also referred to as PBT), and is a resin film containing preferably 60% by mass or more of PBT. The polybutylene terephthalate film is divided into two aspects in accordance with its structure.

A content of PBT in the polybutylene terephthalate film according to the first aspect is preferably 60% by mass or more, more preferably 70% by mass or more, particularly preferably 75% by mass or more, and most preferably 80% by mass or more.

The PBT used as a principal component contains, as a dicarboxylic acid component, preferably 90% by mole or more, more preferably 95% by mole or more, further preferably 98% by mole or more, and most preferably 100% by mole of terephthalic acid. It contains, as a glycol component, preferably 90% by mole or more, more preferably 95% by mole or more, and further preferably 97% by mole or more of 1,4-butanediol.

The polybutylene terephthalate film may contain another polyester resin in addition to PBT. Examples of the polyester resin used in addition to PBT include polyester resins such as PET, polyethylene naphthalate (PEN), polybutylene naphthalate (PBN), and polypropylene terephthalate (PPT), a PBT resin copolymerized with dicarboxylic acid such as isophthalic acid, orthophthalic acid, naphthalenedicarboxylic acid, biphenyl dicarboxylic acid, cyclohexanedicarboxylic acid, adipic acid, azelaic acid, or sebacic acid, and a PBT resin copolymerized with a diol component such as ethylene glycol, 1,3-propylene glycol, 1,2-propylene glycol, neopentyl glycol, 1,5-pentanediol, 1,6-hexanediol, diethylene glycol, cyclohexanediol, polyethylene glycol, polytetramethylene glycol, or polycarbonate diol.

An addition amount of the polyester resin used in addition to PBT is preferably 40% by mass or less. When the addition amount of the polyester resin used in addition to PBT exceeds 40% by mass, mechanical properties as PBT are impaired, so that impact strength, pinhole resistance, and drawability may be insufficient.

The layer structure of the polybutylene terephthalate film according to the first aspect is produced by forming layers of resins and casting the resultant by a cast method, and includes a layered structure portion including a plurality of unit layers. Each of the plurality of unit layers contains PBT as a principal component. For example, each of the plurality of unit layers contains 60% by mass or more of PBT. It is noted that the (n+1)th unit layer is directly laminated on the nth unit layer in the plurality of unit layers. In other words, an adhesive layer or an adhering layer is not formed among the plurality of unit layers. Such a polybutylene terephthalate film includes the layered structure portion including at least 10 layers or more, preferably 60 layers or more, more preferably 250 layers of more and further preferably 1000 layers or more of unit layers.

The polybutylene terephthalate film according to the second aspect includes a single layer containing polyester using PBT as a principal repeating unit. The polyester using PBT as a principal repeating unit contains, for example, 1,4-butanediol or an ester-forming derivative thereof as a glycol component, and terephthalic acid or an ester-forming derivative thereof as a dibasic acid component, as principal components, and encompasses a homo- or copolymer type polyester obtained by condensing these. A content of PBT according to the second aspect is preferably 70% by mass or more, more preferably 80% by mass or more, and most preferably 90% by mass or more.

The polybutylene terephthalate film according to the second aspect may contain another polyester resin, in addition to PBT, in a range of 30% by mass or less. When such a polyester resin is contained, crystallization of PBT can be suppressed, and stretchability of the polybutylene terephthalate film can be improved. As a polyester resin to be blended with PBT, a polyester using ethylene terephthalate as a principal repeating unit can be used. For example, a homo type resin containing, as principal components, ethylene glycol as a glycol component and terephthalic acid as a dibasic acid component can be preferably used.

The polybutylene terephthalate film according to the second aspect can be produced by a tubular method or a tenter method. The tubular method or the tenter method may be employed for stretching an unstretched raw material simultaneously in the lengthwise direction and the widthwise direction, or for stretching successively in the lengthwise direction and the widthwise direction. Among these methods, the tubular method is particularly preferably employed because a stretched film well balanced in properties in the circumferential direction can be obtained.

(Biomass-Derived Polyester Film)

A biomass-derived polyester film contains a resin composition containing, as a principal component, polyester consisting of a diol unit and a dicarboxylic acid unit, the resin composition is preferably a resin composition consisting of a diol unit of biomass-derived ethylene glycol and a dicarboxylic acid unit of a fossil fuel-derived dicarboxylic acid, and is more preferably a resin composition consisting of biomass-derived ethylene glycol and fossil fuel-derived terephthalic acid.

Since biomass-derived ethylene glycol has the same chemical structure as conventional fossil fuel-derived ethylene glycol, a film of polyester synthesized using the biomass-derived ethylene glycol is not inferior to a conventional fossil fuel-derived polyester film in mechanical properties and the like. Accordingly, since the barrier laminate film of the present invention using a biomass-derived polyester film includes layers of carbon neutral materials, the amount of fossil fuel used can be reduced and an environmental load can be reduced as compared with a barrier laminate film produced from a conventional raw material obtained from fossil fuel.

The biomass-derived ethylene glycol is obtained by using, as a raw material, ethanol produced as a raw material of biomass such as sugar cane or corn (biomass ethanol). Biomass ethanol can be obtained by a conventionally known method, and for example, a method for generating ethylene glycol via ethylene oxide or the like can be employed for obtaining biomass-derived ethylene glycol. Alternatively, commercially available biomass ethylene glycol may be used, and for example, biomass ethylene glycol commercially available from India Glycols Limited can be suitably used.

As a dicarboxylic acid unit of polyester, fossil fuel-derived dicarboxylic acid is used. As the dicarboxylic acid, aromatic dicarboxylic acid, aliphatic dicarboxylic acid and derivatives thereof can be used. Examples of the aromatic dicarboxylic acid include terephthalic acid and isophthalic acid, and examples of derivatives of aromatic dicarboxylic acid include lower alkyl esters, specifically, methyl ester, ethyl ester, propyl ester and butyl ester, of aromatic dicarboxylic acid. Among these, terephthalic acid is preferred, and a derivative of aromatic dicarboxylic acid is preferably dimethyl terephthalate.

As the plastic substrate of the present invention, a single film of biomass-derived polyester can be used. Alternatively, a film of a resin containing biomass-derived polyester, and one, two or more of fossil fuel-derived polyester, recycled polyester of a fossil fuel-derived polyester product, and recycled polyester of a biomass-derived polyester product can be used.

Since carbon dioxide in the air contains $^{14}C$ in a prescribed ratio (105.5 pMC), it is known that a plant growing with carbon dioxide in the air taken in, such as corn, has a $^{14}C$ content of about 105.5 pMC. Besides, it is also known that fossil fuel minimally contains $^{14}C$. Accordingly, when a ratio of $^{14}C$ contained in all carbon atoms of polyester is measured, a ratio of biomass-derived carbon can be calculated.

In the present invention, the term "biomass degree" refers to a weight ratio of a biomass-derived component. Taking PET as an example, since PET is obtained by polymerizing ethylene glycol containing 2 carbon atoms and terephthalic acid containing 8 carbon atoms in a molar ratio of 1:1, when merely biomass-derived ethylene glycol is used, a weight ratio of a biomass-derived component in the PET is 31.25%, and hence its biomass degree is 31.25% (molecular weight derived from biomass-derived ethylene glycol/molecular weight of single polymerization unit of polyester=60≈192).

Besides, a weight ratio of a biomass-derived component in fossil fuel-derived polyester is 0%, and hence a biomass degree of the fossil fuel-derived polyester is 0%. In the present invention, a biomass degree in the plastic substrate is preferably 5.0% or more, more preferably 10.0% or more, and preferably 30.0% or less.

(Recycled Polyester Terephthalate)

As the plastic substrate of the present invention, a substrate containing polyester terephthalate (hereinafter sometimes also referred to as PET) recycled by mechanical recycling can be used.

Specifically, the plastic substrate contains PET recycled by mechanical recycling of PET bottles, and in this PET, a diol component is ethylene glycol, and a dicarboxylic acid component contains terephthalic acid and isophthalic acid.

Here, mechanical recycling refers to, in general, a method in which a resin product made of a PET resin is cleaned to be restored to a PET resin by crushing recovered polyethylene terephthalate resin products such as PET bottles, alkali cleaning the resultant to remove stains and foreign substances remaining on surfaces of the PET resin products, and drying the resultant at a high temperature under reduced pressure for a prescribed period of time to diffuse and decontaminate contaminants remaining inside the PET resins.

Hereinafter, polyethylene terephthalate obtained by recycling PET bottles is referred to as "recycled polyethylene terephthalate (hereinafter sometimes also referred to as recycled PET)", and polyethylene terephthalate not recycled is referred to as "virgin polyethylene terephthalate (hereinafter sometimes also referred to as virgin PET)".

In the PET contained in the plastic substrate, a content of an isophthalic acid component is preferably 0.5% by mole or more and 5% by mole or less, and more preferably 1.0% by mole or more and 2.5% by mole or less based on all dicarboxylic acid components contained in the PET.

When the content of the isophthalic acid component is less than 0.5% by mole, flexibility is not improved in some cases, and on the other hand, when the content exceeds 5% by mole, a melting point of the PET is lowered and hence heat resistance is insufficient in some cases.

It is noted that PET may be usual fossil fuel-derived PET or biomass PET. The "biomass PET" contains biomass-derived ethylene glycol as a diol component, and fossil fuel-derived dicarboxylic acid as a dicarboxylic acid component. The biomass PET may be made of merely PET containing biomass-derived ethylene glycol as a diol component and fossil fuel-derived dicarboxylic acid as a dicarboxylic acid component, or may be made of PET containing biomass-derived ethylene glycol and fossil fuel-derived diol as a diol component, and fossil fuel-derived dicarboxylic acid as a dicarboxylic acid component.

PET used for a PET bottle can be obtained by a conventionally known method of polycondensation of the diol component and dicarboxylic acid component described above.

Specifically, it can be produced by a general melt polymerization method in which polycondensation is performed under reduced pressure after esterification and/or transesterification of the diol component and the dicarboxylic acid component, or a known solution heating dehydration condensation using an organic solvent.

An amount of the diol component used in producing the PET is substantially equivalent molar amount to 100 moles of dicarboxylic acid or a derivative thereof, but is, in general, excessive by 0.1% by mole or more and 20% by mole or less because of distillation occurring in esterification and/or transesterification and/or polycondensation.

Besides, polycondensation is preferably performed in the presence of a polymerization catalyst. Timing of adding the polymerization catalyst is not especially limited as long as it is before the polycondensation, and the catalyst may be added in charging raw materials, or in starting pressure reduction.

PET obtained by recycling PET bottles may be subjected to, after polymerization and solidification as described above, solid state polymerization, if necessary, for further increasing a degree of polymerization or removing an oligomer such as a cyclic trimer.

Specifically, solid polymerization is performed, after chipping and drying PET, by pre-crystallizing the PET by heating at a temperature of 100° C. or more and 180° C. or less for about 1 hour to 8 hours, and subsequently heating the resultant at a temperature of 190° C. or more and 230° C. or less for 1 hour to several tens hours in an inert gas atmosphere or under reduced pressure.

The PET contained in the recycled PET has a limiting viscosity of preferably 0.58 dl/g or more and 0.80 dl/g or less. When the limiting viscosity is less than 0.58 dl/g, mechanical characteristics required of a PET film as a resin substrate may be insufficient. On the other hand, when the limiting viscosity exceeds 0.80 dl/g, productivity in film forming process may be impaired. It is noted that the limiting viscosity is measured with an orthochlorophenol solution at 35° C.

The recycled PET preferably contains recycled PET in a ratio of 50% by weight or more and 95% by weight or less, and may contain virgin PET in addition to the recycled PET.

The virgin PET may be PET containing ethylene glycol as a diol component and terephthalic acid and isophthalic acid as a dicarboxylic acid component as described above, or may be PET not containing isophthalic acid as a dicarboxylic acid component. Besides, the resin substrate layer may contain another polyester in addition to PET. For example, in addition to aromatic dicarboxylic acid such as terephthalic acid or isophthalic acid, aliphatic dicarboxylic acid or the like may be contained as a dicarboxylic acid component.

Specific examples of aliphatic dicarboxylic acid include chain or alicyclic dicarboxylic acids usually having 2 or more and 40 or less carbon atoms, such as oxalic acid, succinic acid, glutaric acid, adipic acid, sebacic acid, dodecanedioic acid, dimer acid, and cyclohexanedicarboxylic acid. Examples of a derivative of aliphatic dicarboxylic acid include a lower alkyl ester such as methyl ester, ethyl ester, propyl ester or butyl ester of the aliphatic dicarboxylic acid, and a cyclic acid anhydride of the aliphatic dicarboxylic acid such as succinic anhydride. Among these, the aliphatic dicarboxylic acid is preferably adipic acid, succinic acid, dimer acid or a mixture of these, and particularly preferably one containing succinic acid as a principal component. The derivative of the aliphatic dicarboxylic acid is more preferably methyl ester of adipic acid or succinic acid, or a mixture of these.

The plastic substrate formed from such PET may have a single layer or multiple layers.

When the recycled PET as described above is used as the plastic substrate, it may be a resin substrate including three layers of a first layer 1a, a second layer 1b and a third layer 1c as illustrated in FIG. 1b.

In this case, it is preferable that the second layer 1b is a layer containing the recycled PET alone, or a mixed layer of the recycled PET and virgin PET, and that the first layer 1a and the third layer 1c are layers containing virgin PET alone.

When virgin PET alone is used in the first layer 1a and the third layer 1c in this manner, the recycled PET can be prevented from being exposed on a top surface or a rear surface of the plastic substrate. Therefore, hygiene of a resultant laminate can be assured.

Alternatively, the resin substrate layer may be a plastic substrate including two layers of the second layer 1b and the third layer 1c without providing the first layer 1a in FIG. 1b. Alternatively, the plastic substrate may be a plastic substrate including two layers of the first layer 1a and the second layer 1b without providing the third layer 1c in FIG. 1b. Also in these cases, it is preferable that the second layer 1b is a layer containing the recycled PET alone or a mixed layer of the recycled PET and virgin PET, and that the first layer 1a and the third layer 1c are layers containing virgin PET alone.

When the recycled PET and virgin PET are mixed to mold one layer, a method in which these are separately supplied to a molding machine, a method in which these are mixed by dry blending before supplying, or the like may be employed. In particular, from the viewpoint of operational easiness, the method in which these are mixed by dry blending is preferred.

The PET forming the resin substrate can contain various additives during production process or after the production as long as the characteristics are not impaired. Examples of the additives include a plasticizer, a ultraviolet stabilizer, an anti-coloring agent, a matting agent, a deodorant, a flame retardant, a weatherproofing agent, an antistatic agent, a thread friction reducing agent, a releasing agent, an antioxidant, an ion exchanger, and a color pigment. It is preferable that the additives are contained in a range of an amount of 5% by mass or more and 50% by mass or less, and preferably 5% by mass or more and 20% by mass or less in the whole resin composition including the PET.

The resin substrate can be formed by film formation using the PET by, for example, a T-die method. Specifically, after drying the PET, the resultant PET is supplied to a melt extruder heated to a range from a temperature equal to or higher than a melting point (Tm) of the PET to the temperature Tm+70° C. for melting the resin composition. The resultant is, for example, extruded using a die such as a T-die into a sheet shape, the extruded sheet shaped product is rapidly cooled and solidified using a rotating cooling drum or the like, and thus, a film can be molded. As the melt extruder, a single screw extruder, a twin screw extruder, a vent extruder, a tandem extruder or the like can be used in accordance with intended purpose.

The film obtained as described above is preferably biaxially stretched. Biaxial stretching can be performed by a conventionally known method. For example, the film extruded onto the cooling drum as described above is subsequently heated by roll heating, infrared heating or the like to be stretched in a longitudinal direction to obtain a longitudinally stretched film. This stretching is performed preferably by utilizing a peripheral speed difference among two or more rolls. The longitudinal stretching is usually performed in a temperature range of 50° C. or more and 100° C. or less. Besides, a draw ratio of the longitudinal stretching depends on characteristics required for the use of the film, and is preferably 2.5 times or more and 4.2 times or less. When the draw ratio is less than 2.5 times, thickness variation of the resultant PET film is so large that a good film is difficult to obtain.

The longitudinally stretched film is subsequently subjected to processing of lateral stretching, heat setting, and heat relaxing to be formed into a biaxially stretched film. The lateral stretching is performed usually in a temperature range of 50° C. or more and 100° C. or less. A draw ratio of the lateral stretching depends on characteristics required for the use, and is preferably 2.5 times or more and 5.0 times or less. When it is less than 2.5 times, thickness variation of the resultant film is so large that a good film is difficult to obtain, and when it exceeds 5.0 times, the film is easily ruptured during the formation.

After the lateral stretching, the heat setting treatment is subsequently performed, and a preferable temperature range for the heat setting is a temperature Tg of the PET+70° C. to the temperature Tm−10° C. Besides, a time for the heat setting is preferably 1 second or more and 60 seconds or less. For use requiring reduction of thermal shrinkage, the heat relaxing treatment may be performed if necessary.

A thickness of the PET film obtained as described above is arbitrary in accordance with the intended use, and is usually about 5 μm or more and 100 μm or less, and preferably 5 μm or more and 25 μm or less. Besides, breaking strength of the PET film is 5 kg/mm$^2$ or more and 40 kg/mm$^2$ or less in the MD direction, and 5 kg/mm$^2$ or more and 35 kg/mm$^2$ or less in the TD direction, and elongation at break is 50% or more and 350% or less in the MD direction and 50% or more and 300% or less in the TD direction. Furthermore, a shrinkage factor obtained when it is allowed to stand under a temperature environment of 150° C. for 30 minutes is 0.1% or more and 5% or less.

It is noted that virgin PET may be fossil fuel polyethylene terephthalate (hereinafter sometimes also referred to as fossil fuel PET), or biomass PET. Here, the "fossil fuel PET" contains fossil fuel-derived diol as a diol component, and fossil fuel-derived dicarboxylic acid as a dicarboxylic acid component. Besides, the recycled PET may be obtained by recycling PET resin products formed by using fossil fuel PET, or by recycling PET resin products formed by using biomass PET.

A high stiffness PET film refers to a stretched plastic film having loop stiffness of 0.0017 N/15 mm or more in a flow direction (MD) and a vertical direction (TD), and containing 51% by mass or more of PET. A thickness of the high stiffness PET film is preferably 5 μm or more, and more preferably 7 μm or more. Besides, the thickness of the high stiffness PET film is preferably 25 μm or less, and more preferably 20 μm or less.

Loop stiffness refers to a parameter corresponding to elasticity of a film. Hereinafter, a measurement method for loop stiffness will be described with reference to FIGS. 4 to 9.

It is noted that the measurement method described below can be employed not only for a single layer film such as a stretched plastic film but also for a film including a plurality of layers such as a deposited film or a laminate film. A deposited film refers to a film, such as the barrier laminate film A described above, including a single layer film, and a deposited layer formed on the single layer film. A laminate film refers to a film including a plurality of laminated films like a packaging material described later.

FIG. 4 is a plan view illustrating a test piece 40 and a loop stiffness measuring device 45, and FIG. 5 is a cross-sectional view of the test piece 40 and the loop stiffness measuring device 45 taken on line IV-IV of FIG. 4. The test piece 40 is a rectangular film having a long side and a short side. Herein, a length L1 of the long side of the test piece 40 is set to 150 mm, and a length L2 of the short side is set to 15 mm. As the loop stiffness measuring device 45, for example, No. 581 LOOP STIFFNESS TESTER(R) DA manufactured by Toyo Seiki Seisaku-sho, Ltd. can be used. It is noted that the length L1 of the long side of the test piece 40 can be adjusted as long as the test piece 40 can be grasped by a pair of chuck portions 46 described later.

The loop stiffness measuring device 45 includes the pair of chuck portions 46 for grasping a pair of end portions in the lengthwise direction of the test piece 40, and a supporting member 47 for supporting the chuck portions 46. Each of the chuck portions 46 includes a first chuck 461 and a second chuck 462. In a state illustrated in FIGS. 4 and 5, the test piece 40 is placed on the pair of first chucks 461, and the second chucks 462 have not grasped yet the test piece 40 with the first chucks 461. As described later, at the time of measurement, the test piece 40 is grasped between the first chucks 461 and the second chucks 462 of the chuck portions 46. The second chucks 462 may be linked to the first chucks 461 via a hinge mechanism.

When a film, such as a stretched plastic film, a deposited film or a laminate film, to be measured is available in a state prior to processing into a packaging product, the test piece 40 may be prepared by cutting the film to be measured. Alternatively, the test piece 40 may be obtained by cutting a packaging product such as a bag produced from a packaging material to take out the film to be measured.

A method for measuring loop stiffness of the test piece 40 by using the loop stiffness measuring device 45 will be described. First, as illustrated in FIGS. 4 and 5, the test piece 40 is placed on the first chucks 461 of the pair of chuck portions 46 formed at a distance L3. Herein, the distance L3 is set in such a manner that a length of a loop portion 41 (hereinafter sometimes also referred to as the loop length) described later can be 60 mm. The test piece 40 includes an inner surface 40x positioned on a side of the first chucks 461, and an outer surface 40y positioned on the opposite side of the inner surface 40x. When the test piece 40 is obtained from a packaging material, the inner surface 40x and the outer surface 40y of the test piece 40 respectively correspond to an inner surface and an outer surface of the packaging material. Subsequently, as illustrated in FIG. 6, the second chucks 462 are formed on the test piece 40 such that the end portions in the lengthwise direction of the test piece 40 can be grasped together with the first chucks 461.

Subsequently, as illustrated in FIG. 7, at least one of the pair of chuck portions 46 is slid on the supporting member 47 in a direction for reducing the distance between the pair of chuck portions 46. Thus, a loop portion 41 can be formed in the test piece 40. The test piece 40 illustrated in FIG. 7 includes the loop portion 41, a pair of intermediate portions 42 and a pair of fixed portions 43. The pair of fixed portions 43 corresponds to portions of the test piece 40 grasped by the pair of chuck portions 46. The pair of intermediate portions 42 corresponds to portions of the test piece 40 formed between the loop portion 41 and the pair of fixed portions 43. As illustrated in FIG. 7, the chuck portions 46 are slid on the supporting member 47 until the inner surfaces 40x of the pair of intermediate portions 42 come into contact with each other. Thus, the loop portion 41 having the loop length of 60 mm can be formed. The loop length of the loop portion 41 corresponds to a length of the test piece 40 between a position P1 where the surface of one of the second chucks 462 on a side of the loop portion 41 crosses the test piece 40 and a position P2 where the surface of the other of the second chucks 462 on a side of the loop portion 41 crosses the test piece 40. Assuming that the thickness of the test piece 40 is ignorable, the distance L3 is obtained as a value by adding 2×t to the length of the loop portion 41. Here, t represents a thickness of each second chuck 462 of the chuck portion 46.

Thereafter, as illustrated in FIG. 8, the attitude of the chuck portions 46 is adjusted in such a manner that a projecting direction Y of the loop portion 41 against the chuck portions 46 accords with a horizontal direction. For example, the attitude of the chuck portions 46 supported by the supporting member 47 is adjusted by moving the supporting member 47 in such a manner that the normal direction of the supporting member 47 accords with the horizontal direction. In the exemplified case of FIG. 7, the projecting direction Y of the loop portion 41 accords with the thickness direction of the chuck portions. Besides, a load cell 48 is prepared in a position away from the second chucks 462 by a distance Z1 in the projecting direction Y of the loop portion 41. Herein, the distance Z1 is set to 50 mm. Subsequently, the load cell 48 is moved toward the loop portion 41 of the test piece 40 at a speed V by a distance Z2 illustrated in FIG. 8. The distance Z2 is set, as illustrated in FIGS. 8 and 9, in such a manner that the load cell 48 comes into contact with the loop 41, and then pushes the loop portion 41 toward the chuck portions 46. Herein, the distance Z2 is set to 40 mm. In this case, a distance Z3 between the load cell 48 and the second chucks 462 of the chuck portions 46 in a state where the load cell 48 pushes the loop portion 41 toward the chuck portions 46 is 10 mm. The speed V for moving the load cell 48 is set to 3.3 mm/sec.

Subsequently, in the state where the load cell 48 is moved by the distance Z2 toward the chuck portions 46 and pushes the loop portion 41 of the test piece 40 illustrated in FIG. 9, after a value of load applied from the loop portion 41 to the load cell 48 is stabilized, the value of the load is recorded. The value of the load thus obtained is employed as the loop stiffness of the film forming the test piece 40. Herein, the environment for the measurement of the loop stiffness is a temperature of 23° C. and a relative humidity of 50% unless otherwise stated.

Preferable mechanical characteristics of the high stiffness PET film will be further described.

Piercing strength of the high stiffness PET film is preferably 9.5 N or more, and more preferably 10.0 N or more.

Tensile strength in the flow direction of the high stiffness PET film is preferably 250 MPa or more, and more preferably 280 MPa or more. Tensile strength in the vertical direction of the high stiffness PET film is preferably 250 MPa or more, and more preferably 280 MPa or more.

Tensile elongation in the flow direction of the high stiffness PET film is preferably 130% or less, and more preferably 120% or less. Tensile elongation in the vertical direction of the high stiffness PET film is preferably 120% or less, and more preferably 110% or less.

As described above, a value obtained by dividing the tensile strength of the high stiffness PET film by the tensile elongation in at least one of the directions is preferably 2.0 [MPa/%] or more. For example, a value obtained by dividing the tensile strength in the vertical (TD) direction of the high stiffness film by the tensile elongation is preferably 2.0 [MPa/%] or more, and more preferably 2.2 [MPa/%] or more. A value obtained by dividing the tensile strength in the flow (MD) direction of the high stiffness film by the tensile elongation is preferably 1.8 [MPa/%] or more, and more preferably 2.0 [MPa/%] or more.

The tensile strength and the tensile elongation can be measured in accordance with JIS K7127. As a measurement apparatus, a tensile testing machine STA-1150 manufactured by Orientec Co., Ltd. can be used. As the test piece, a rectangular film having a width of 15 mm and a length of 150 mm obtained by cutting the high stiffness PET film can be used. A distance between the pair of chucks holding the test piece is 100 mm at the start of the measurement, and a tensile speed is 300 ram/min. An environmental temperature in the test is 25° C., and a relative humidity is 50%. Tensile strength and tensile elongation of the barrier laminate film A including the high stiffness PET film, tensile strength and tensile elongation of the PBT film, and tensile strength and tensile elongation of the barrier laminate film A including the PBT film are also measured in the same manner as in the measurement of the high stiffness PET film.

A thermal shrinkage factor in the flow direction of the high stiffness PET film is preferably 0.7% or less, and more preferably 0.5% or less. A thermal shrinkage factor in the vertical direction of the high stiffness PET film is preferably 0.7% or less, and more preferably 0.5% or less. A heating temperature for measuring the thermal shrinkage factor is 100° C., and a heating time is 40 minutes.

A Young's modulus in the flow direction of the high stiffness PET film is preferably 4.0 GPa or more, and more preferably 4.5 GPa or more. A Young's modulus in the vertical direction of the high stiffness PET film is preferably 4.0 GPa or more, and more preferably 4.5 GPa or more.

In the production process of the high stiffness PET film, for example, a first stretching step of stretching a PET film, obtained by melting and molding polyethylene terephthalate, in the flow direction and the vertical direction at 90° C. to 145° by 3 times to 4.5 times is first performed. Subsequently, a second stretching step of stretching the plastic film in the flow direction and the vertical direction at 100° C. to 145° C. by 1.1 times to 3.0 times is performed. Thereafter, the heat setting is performed at a temperature of 190° C. to 220° C. Then, a relaxing treatment (treatment for reducing the film width) of about 0.2% to 2.5% is performed in the flow direction and the vertical direction at a temperature of 100° C. to 190° C. In these procedures, a draw ratio, a stretching temperature, a heat setting temperature, and a relaxing ratio are adjusted, and thus, the high stiffness PET film having the aforementioned mechanical characteristics can be obtained.

Next, preferable mechanical characteristics of the barrier laminate film A including the above-described high stiffness PET film as the plastic substrate 1 will be further described.

Loop stiffness in the flow direction (MD) and the vertical direction (TD) of the barrier laminate film A are preferably 0.0017 N or more.

Piercing strength of the barrier laminate film A is preferably 9.5 N or more, and more preferably 10.0 N or more.

Tensile strength in the flow direction of the barrier laminate film A is preferably 250 MPa or more, and more preferably 280 MPa or more. Tensile strength in the vertical direction of the barrier laminate film A is preferably 250 MPa or more, and more preferably 280 MPa or more.

Tensile elongation in the flow direction of the barrier laminate film A is preferably 130% or less, and more preferably 120% or less. Tensile elongation in the vertical direction of the barrier laminate film A is preferably 120% or less, and more preferably 110% or less.

Preferably, a value obtained by dividing the tensile strength of the barrier laminate film A by the tensile elongation in at least one of the directions is 2.0 [MPa/%] or more. For example, a value obtained by dividing the tensile strength in the vertical direction (TD) of the barrier laminate film A by the tensile elongation is preferably 2.0 [MPa/%] or more, and more preferably 2.2 [MPa/%] or more. A value obtained by dividing the tensile strength in the flow direction (MD) of the barrier laminate film A by the tensile elongation is preferably 1.8 [MPa/%] or more, and more preferably 2.0 [MPa/%] or more.

A thermal shrinkage factor in the flow direction of the barrier laminate film A is preferably 0.7% or less, and more preferably 0.5% or less. A thermal shrinkage factor in the vertical direction of the barrier laminate film A is preferably 0.7% or less, and more preferably 0.5% or less. A heating temperature for measuring the thermal shrinkage factor is 100° C., and a heating time is 40 minutes.

A Young's modulus in the flow direction of the barrier laminate film A is preferably 4.0 GPa or more, and more preferably 4.5 MPa or more. A Young's modulus in the vertical direction of the barrier laminate film A is preferably 4.0 GPa or more, and more preferably 4.5 GPa or more.

A thickness of the plastic film used as the plastic substrate in the present invention as described above is not especially limited, and may be a thickness that can be subjected to a pretreatment or a film forming treatment performed in forming a deposited film by using a roller-type continuous deposited film forming apparatus, and from the viewpoint of flexibility and shape retention, the thickness is 6 to 400 µm, and preferably in a range of 9 to 200 µm.

When the thickness of the plastic film falls in the above-described range, the film is easily bent and is not broken during conveyance, and is easily dealt with in a continuous deposited film forming apparatus used for production of a laminate film including an aluminum oxide deposited film having improved adhesiveness and a barrier property.

Next, the aluminum oxide deposited film will be described. Herein, for film formation of the aluminum oxide deposited film, a surface of the film of the plastic substrate is preferably subjected to an oxygen plasma pretreatment using a plasma pretreatment apparatus described below in order to improve the adhesiveness between the plastic substrate and the aluminum oxide deposited film and the like. An oxygen plasma pretreatment of the present invention is an oxygen plasma treatment performed with a bias voltage vertically applied to the plastic substrate. The oxygen plasma pretreatment of the present invention is a pretreatment for enhancing and improving adhesiveness and the like between a film or sheet of various resins and the aluminum oxide deposited film in the present invention, and performed in a deposited film forming apparatus as described below.

In a roller-type continuous deposited film forming apparatus 10 suitably used for production of the laminate film including the aluminum oxide deposited film having improved adhesiveness and a barrier property of the present invention, partition walls 35a to 35c are formed within a decompression chamber 12 as illustrated in FIG. 2. A substrate conveyance chamber 12A, a plasma pretreatment chamber 12B and a film forming chamber 12C are formed by the partition walls 35a to 35c, and in particular, the plasma pretreatment chamber 12B and the film forming chamber 12C are formed as spaces surrounded by the partition walls 35a to 35c, and in each of the chambers, an exhaust chamber is further formed if necessary.

(Oxygen Plasma Pretreatment)

In the plasma pretreatment chamber 12B, a plasma pretreatment roller 20 capable of conveying a plastic substrate S to be pretreated and performing a plasma treatment is formed to be partly exposed to the substrate conveyance chamber 12A, and the plastic substrate S moves to the plasma pretreatment chamber 12B while being wound.

The plasma pretreatment chamber 12B and the film forming chamber 12C are provided adjacently to the substrate conveyance chamber 12A, and hence the plastic substrate S can move without being exposed to the air. Besides, the pretreatment chamber 12B and the substrate conveyance chamber 12A are communicated with each other through a rectangular hole, and a part of the plasma pretreatment roller 20 protrudes through the rectangular hole into the substrate conveyance chamber 12A. There is a gap between a wall of the conveyance chamber and the pretreatment roll 20, and the substrate S can move from the substrate conveyance chamber 12A to the film forming chamber 12C through the gap. The substrate conveyance chamber 12A and the film forming chamber 12C have a similar structure, and thus, the plastic substrate S can move without being exposed to the air.

In the substrate conveyance chamber 12A, a take-up roller as winding means for winding, in a roll shape, the plastic substrate S, which has been moved again to the substrate conveyance chamber 12A by a film forming roller 23 and includes a deposited film formed on one surface thereof, is provided, so that the plastic substrate S including the deposited film formed thereon can be wound.

In producing the laminate film including the aluminum oxide deposited film having improved adhesiveness and a barrier property of the present invention, the plasma pretreatment chamber 12B is constructed in such a manner that a space where plasma is generated can be separated from the other region and an opposing space can be efficiently evacuated, and thus, a plasma gas concentration can be easily controlled and the productivity is improved. A pretreatment pressure employed for formation under reduced pressure can be set to and retained at about 0.1 Pa to 100 Pa, and in particular, in order to obtain a preferable transformation ratio of the transition region of the aluminum oxide deposited film of the present invention, the treatment pressure of the oxygen plasma pretreatment is preferably 1 to 20 Pa.

A conveyance speed of the plastic substrate S is not especially limited, and from the viewpoint of production efficiency, can be set to at least 200 to 1000 m/min, and particularly for obtaining the transformation ratio of the transition region of the aluminum oxide deposited film of the present invention, the conveyance speed in the oxygen plasma pretreatment is preferably 300 to 800 m/min.

The plasma pretreatment roller 20 included in the plasma pretreatment apparatus aims to prevent shrinkage and damage of the plastic substrate S otherwise caused by heat applied in plasma treatment performed by plasma pretreatment means, and to apply oxygen plasma P uniformly and widely for the plastic substrate S.

It is preferable that the pretreatment roller 20 can be set to a prescribed temperature between −20° C. and 100° C. by adjusting a temperature of a temperature control medium circulated within the pretreatment roller.

The plasma pretreatment means includes plasma supply means and magnetic field forming means. The plasma pretreatment means confines the oxygen plasma P in the vicinity of the surface of the plastic substrate S together with the plasma pretreatment roller 20.

The plasma pretreatment means is provided so as to cover a part of the pretreatment roller 20. Specifically, the plasma supply means and the magnetic field forming means included in the plasma pretreatment means are formed along a surface in the vicinity of the outer peripheral of the pretreatment roller 20, so as to form a gap sandwiched between the pretreatment roller 20 and the magnetic field forming means including plasma supply nozzles 22*a* to 22*c* that supply a plasma material gas and work as electrodes for generating the plasma P, and a magnet 21 or the like for accelerating the generation of the plasma P.

In this manner, when the plasma supply nozzles 22*a* to 22*c* are opened to a space of the gap to jet the plasma toward the substrate surface to make the gap work as a plasma forming region, and a region having a higher plasma density is formed in the vicinity of the surfaces of the pretreatment roller 20 and the plastic substrate S, the oxygen plasma pretreatment of the present invention for forming a plasma treated surface on one surface of the plastic substrate S can be performed.

The plasma supply means of the plasma pretreatment means includes a material volatile supplying device 18 provided outside the decompression chamber 12 and connected to the plasma supply nozzles, and a material gas supply line through which the material gas supply is supplied from the device. The plasma material gas to be supplied is oxygen alone or a mixed gas of an oxygen gas and an inert gas supplied from a gas reservoir via a flow rate controller for measuring a flow rate of the gas. Examples of the inert gas include one or a mixed gas of two or more gases selected from the group consisting of argon, helium and nitrogen.

Such gases supplied are mixed in a predetermined ratio if necessary to form a plasma material single gas or a plasma forming mixed gas, and then supplied to the plasma supply means. The single or mixed gas is supplied to the plasma supply nozzles 22*a* to 22*c* of the plasma supply means to be supplied to the vicinity of the outer peripheral of the pretreatment roller 20 where supply ports of the plasma supply nozzles 22*a* to 22*c* are opened.

Each of the nozzle openings is directed toward the plastic substrate S formed on the pretreatment roll 20 to be formed and constructed such that the oxygen plasma P can be uniformly diffused and supplied to the whole surface of the plastic substrate S, and thus, the plasma pretreatment can be uniformly performed in a portion having a large area on the plastic substrate S.

In the oxygen plasma pretreatment for obtaining the transformation ratio of the transition region of the aluminum oxide deposited film of the present invention, a mixed ratio between the oxygen gas and the inert gas, that is, oxygen gas/inert gas, is preferably 6/1 to 1/1, and more preferably 5/2 to 3/2.

When the mixed ratio is 6/1 to 1/1, film formation energy of deposited aluminum on the plastic film substrate is increased, and when it is 5/2 to 3/2, aluminum hydroxide is formed in the vicinity of the interface of the substrate, namely, the transformation ratio of the transition region is lowered.

The plasma supply nozzles 22*a* to 22*c* function as a counter electrode of the pretreatment roller 20, and have a function as an electrode, so that the supplied plasma material gas can be excited by a potential difference caused by a high frequency voltage, a low frequency voltage or the like supplied between these and the pretreatment roller 20, and thus, the plasma P is generated and supplied.

Specifically, the plasma supply means of the plasma pretreatment means includes, as a plasma supply, a power supply 32, which can apply an AC voltage having a frequency of 10 Hz to 2.5 GHz between the plasma pretreatment roller and the counter electrode, controls input power, impedance or the like, can obtain a state where an arbitrary voltage is being applied to the gap from the plasma pretreatment roller 20, and can apply a bias voltage for causing the oxygen plasma P to have positive potential so as to perform a treatment for physically or chemically modifying the surface physical properties of the substrate.

Plasma intensity per unit area employed in the present invention is 50 to 8000 W·sec/m$^2$, and when it is 50 W·sec/m$^2$ or less, the effects of the plasma pretreatment cannot be obtained, and when it is 8000 W·sec/m$^2$ or more, deterioration of the substrate such as wastage, coloring and firing caused by the plasma tends to occur. In particular, the plasma intensity of the oxygen plasma pretreatment for obtaining the transformation ratio of the transition region of the aluminum oxide deposited film of the present invention is preferably 100 to 1000 W·sec/m$^2$. When a bias voltage is vertically applied to the plastic substrate to apply the plasma intensity, the adhesiveness and the like to the aluminum oxide deposited film can be stably increased than in a conventional method.

The plasma pretreatment means includes the magnetic field forming means. As the magnetic field forming means, an insulating spacer and a base plate are provided within a magnet case, and the magnet 21 is provided on the base plate. An insulating shield plate is provided with the magnet case, and an electrode is attached onto the insulating shield plate.

Accordingly, the magnet case and the electrode are electrically insulated from each other, and hence even though the magnet case is formed and fixed in the decompression chamber 12, the electrode can be placed at an electrically floating level.

A power supply line 31 is connected to the electrode, and the power supply line 31 is connected to the power supply 32. Besides, a temperature control medium pipe for cooling the electrode and the magnet 21 is formed within the electrode.

The magnet 21 is provided for applying the oxygen plasma P from the plasma supply nozzles 22*a* to 22*c*, corresponding to the electrode as well as the plasma supply means, collectively onto the substrate S. Since the magnet 21 is provided, reactivity in the vicinity of the substrate surface is increased, and hence a good plasma pretreated surface can be rapidly formed.

The magnet 21 has a magnetic flux density of 10 G to 10000 G in a position corresponding to the surface of the plastic substrate S. When the magnetic flux density on the surface of the plastic substrate S is 10 G or more, the reactivity in the vicinity of the substrate surface can be sufficiently increased, and hence a good pretreated surface can be rapidly formed.

Since ions and electrons formed during the plasma pretreatment move in accordance with the position and the structure of the magnet 21 of the electrode, for example, even when the plasma pretreatment is performed on the plastic substrate S having a large area of 1 m² or more, the electrons and the ions, and decomposed products of the substrate are homogeneously diffused over the whole surface of the electrode, and therefore, even when the plastic substrate S has a large area, the desired pretreatment can be performed uniformly and stably with desired plasma intensity.

(Aluminum Oxide Deposited Film)

The plastic substrate S having been subjected to the special oxidation plasma treatment is moved from the substrate conveyance chamber 12A to the film forming chamber 12C by guide rolls 14a to 14d for guiding the substrate to the subsequent film forming chamber 12C, and the aluminum oxide deposited film is formed thereon in a film forming section.

The aluminum oxide deposited film is a thin film of an inorganic oxide containing aluminum oxide as a principal component, and is a layer containing, as a principal component, aluminum oxide, or aluminum oxide that can contain an aluminum compound such as single one of or a mixture of a nitride, a carbide and a hydroxide of aluminum.

Besides, the aluminum oxide deposited film contains the aluminum compound as the principal component, and can contain a metal oxide, or a metal nitride or carbide, or a mixture thereof, such as silicon oxide, silicon nitride, silicon oxynitride, silicon carbide, magnesium oxide, titanium oxide, tin oxide, indium oxide, zinc oxide, and zirconium oxide.

In the aluminum oxide deposited film of the present invention, the transformation ratio of the transition region of the aluminum oxide deposited film is 60% or less.

As for the transformation ratio of the transition region of the aluminum oxide deposited film, while the aluminum oxide deposited film 2 of the barrier laminate film A is being repeatedly soft etched at a constant rate using a Cs (cesium) ion gun, ions derived from the aluminum deposited film and ions derived from the plastic substrate are measured by the time-of-flight secondary ion mass spectrometry (TOF-SIMS), and thus, the analytic graph as illustrated in FIG. 3 is obtained.

Specifically, with a time-of-flight secondary ion mass spectrometer used, the aluminum oxide deposited film is etched with Cs from the outermost surface under prescribed conditions, and elemental bonds on the interface between the aluminum oxide deposited film and the plastic substrate and elemental bonds of the aluminum oxide deposited film are measured, and graphs of the elements and elemental bonds thus measured are obtained (FIG. 3, analytic graph) for performing the following:

1) A position on a graph of an element $C^6$ where the intensity is halved is obtained as the interface between the plastic substrate and aluminum oxide, and a portion from the surface to the interface is obtained as the aluminum oxide deposited film;

2) a peak on a graph corresponding to an elemental bond $Al_2O_4H$ is obtained, and a portion from the peak to the interface is defined and obtained as the transition region; and 3) a transformation ratio of the transition region is defined and obtained by (thickness of transition region from peak of elemental bond $Al_2O_4H$ to interface/thickness of aluminum oxide deposited film)×100(%).

The transformation ratio of the transition region of the aluminum oxide deposited film of the present invention is preferably 60% or less. When it exceeds 60%, the adhesiveness between the plastic substrate and the deposited film is lowered after a hot water treatment performed at 135° C. for 40 min (high retort), or after a hot water treatment performed at 121° C. for 40 min (semi retort), and the barrier performance against steam is deteriorated.

In the hot water treatment (retort treatment), large mechanical and chemical stress is applied to the interface between the plastic substrate and the aluminum oxide deposited film. Due to this stress, the barrier property is deteriorated. The stress is applied to this portion because this portion is the most fragile in the layered structure.

Accordingly, it is significant, for obtaining retort resistance, to coat the deposited film such that the interface with the substrate can be rigid.

Aluminum hydroxide is good at adhesiveness to a plastic substrate owing to its chemical structure, and forms a network by itself and is dense, and hence has a high steam barrier property. In a severe environment as in a retort treatment, however, a bond structure based on a hydrogen bond between aluminum hydroxide and a substrate easily microscopically collapses. Besides, the network of aluminum hydroxide easily permeates into a film due to affinity on a grain boundary between a water molecule and aluminum hydroxide.

In the present invention, in order to make, as narrow as possible, the transition region formed by aluminum hydroxide in the aluminum oxide deposited film on the interface with the plastic substrate, taking note of the elemental bond $Al_2O_4H$, the abundance thereof is controlled to suppress an amount of aluminum hydroxide generated from the elemental bond $Al_2O_4H$ through the hot water treatment. Thus, a ratio of an aluminum oxide film containing a relatively small amount of aluminum hydroxide is increased, and thus, microscopic destruction of the deposited film caused by a water molecule through the retort treatment, and destruction of the interface with the plastic substrate are greatly suppressed. As a result, a laminate film having an unprecedented adhesiveness, a barrier property and retort resistance can be provided.

The aluminum oxide deposited film of the present invention can be formed by forming a deposited film on the plastic substrate surface having been subjected to the oxygen plasma pretreatment. As a vapor deposition method for forming the deposited film, various vapor deposition methods selected from physical vapor deposition and chemical vapor deposition can be applied.

A physical vapor deposition method can be selected from the group consisting a vapor deposition method, a sputtering method, an ion plating method, an ion beam assist method, and a cluster ion beam method, and a chemical vapor deposition method can be selected from the group consisting of a plasma CVD method, a plasma polymerization method, a thermal CVD method, and a catalytic reaction type CVD method. In the present invention, the vapor deposition method of the physical vapor deposition method is suitably employed.

The film formation of the aluminum oxide deposited film using the roller type continuous deposited film forming apparatus 10 in FIG. 2, with which deposition can be performed by the physical vapor deposition method suitable for the present invention, will now be described.

In the deposited film forming apparatus, the plastic substrate S formed in the film forming chamber 12C where the pressure is reduced, and having been subjected to the pretreatment by the plasma pretreatment apparatus is wound and conveyed with its surface to be treated formed outside, and the film forming roller 23 performing the film forming treatment and a target of a film forming source formed to oppose the film forming roller are evaporated to form the deposited film on the plastic substrate surface.

The deposited film forming means 24 employs a resistance heating method, uses an aluminum metal wire as a vapor source of aluminum, and while oxidizing aluminum vapor by supplying oxygen, forms the aluminum oxide deposited film on the surface of the plastic substrate S.

In the present invention, a plurality of aluminum metal wires are formed along the axial direction of the roller 23 in a vapor deposition vessel in a boat shape (designated as a "boat-type"), and are heated by the resistance heating method. In this manner, the aluminum metal material can be evaporated with suppressing heat and heat amount to be supplied, and the aluminum oxide deposited film can be formed with thermal deformation of the plastic substrate S suppressed as much as possible.

The thickness of the aluminum oxide deposited film formed as described above is preferably 3 to 50 nm, and more preferably 9 to 30 nm. When the thickness falls in this range, the barrier property can be retained. When the aluminum oxide deposited film is very thin, however, the transformation ratio of the transition region is difficult to calculate by the TOF-SIMS measurement.

(Barrier Coating Layer)

The barrier coating layer laminated on the surface of the aluminum oxide deposited film of the present invention mechanically/chemically protects the aluminum oxide deposited film as well as improves the barrier performance of the barrier laminate film. Hereinafter, the barrier coating layer coated for forming the barrier laminate film having retort resistance with an excellent barrier property will be described.

The barrier coating layer is formed by applying and solidifying a barrier coating agent on the aluminum oxide deposited film. The barrier coating agent contains a metal alkoxide, a water-soluble polymer, and a silane coupling agent, a sol-gel method catalyst, an acid and the like added if necessary.

An example of the metal alkoxide includes at least one or more metal alkoxide represented by a general formula $R^1 nM(OR^2)m$ (wherein $R^1$ and $R^2$ represent an organic group having 1 to 8 carbon atoms, M represents a metal atom, n represents an integer of 0 or more, m represents an integer of 1 or more, and n+m corresponds to a valence of M), and examples of the metal atom represented by M in the metal alkoxide include silicon, zirconium, titanium, and aluminum, and for example, an alkoxysilane using Si as M is preferably used.

The alkoxysilane is, for example, represented by a general formula $Si(ORa)_4$ (wherein Ra represents a lower alkyl group). In the formula, a methyl group, an ethyl group, an n-propyl group, an n-butyl group, or the like is used as Ra. Specific examples of the alkoxysilane can include tetramethoxysilane $Si(OCH_3)_4$, tetraethoxysilane $Si(OC_2H_5)_4$, tetrapropoxysilane $Si(OC_3H_7)_4$, and tetrabutoxysilane $Si(OC_4H_9)_4$. Two or more of these alkoxides may be used together.

As the silane coupling agent, one having a reactive group such as a vinyl group, an epoxy group, a methacryl group, or an amino group can be used. In particular, organoalkoxysilane having an epoxy group is preferable, and for example, γ-glycidoxypropyltrimethoxysilane, γ-glycidoxypropylmethyldiethoxysilane, or β-(3,4-epoxycyclohexyl) ethyltrimethoxysilane can be used. One of or a mixture of two or more of these silane coupling agents may be used.

As the water-soluble polymer, a polyvinyl alcohol-based resin, or an ethylene-vinyl alcohol copolymer can be singly used, or a combination of a polyvinyl alcohol-based resin and an ethylene-vinyl alcohol copolymer can be used. In the present invention, a polyvinyl alcohol-based resin is preferable.

As the polyvinyl alcohol-based resin, one obtained by saponifying polyvinyl acetate can be generally used. The polyvinyl alcohol-based resin may be a partially saponified polyvinyl alcohol-based resin in which several tens % of acetic acid groups remain, or a completely saponified polyvinyl alcohol in which no acetic acid group remains, or a modified polyvinyl alcohol-based resin in which an OH group is modified. As for a saponification degree, it is necessary to use at least a polyvinyl alcohol-based resin causing crystallization for improving film hardness of the gas barrier coating film, and the saponification degree is preferably 70% or more. Besides, as for a polymerization degree, one having a polymerization degree falling in a range used in a conventional sol-gel method (about 100 to 5000) can be used. Examples of such a polyvinyl alcohol-based resin include an RS resin manufactured by Kuraray Co., Ltd., "RS-110 (saponification degree=99%, polymerization degree=1,000)", and "Gohsenol NM-14 (saponification degree=99%, polymerization degree=1,400)" manufactured by The Nippon Synthetic Chemical Industry Co., Ltd.

As the ethylene-vinyl alcohol copolymer, a saponified product of a copolymer of ethylene and vinyl acetate, namely, a product obtained by saponifying an ethylene-vinyl acetate random copolymer, can be used.

The saponified product is not especially limited, and embraces those ranging from a partial saponified product in which several tens % by mole of acetic acid groups remain, to a completely saponified product in which merely several % by mole or no acetic acid groups remain. From the viewpoint of the barrier property, however, a saponified product having a saponification degree of preferably 80% by mole or more, more preferably 90% by mole or more, and further preferably 95% by mole or more is preferably used.

In the present invention, the barrier coating layer can be produced by the following method.

First, the metal alkoxide, a water-soluble polymer, and a silane coupling agent, a sol-gel method catalyst, and an acid added if necessary, and a solvent of water, and an organic solvent of alcohol such as methyl alcohol, ethyl alcohol or isopropanol are mixed to prepare a barrier coating agent.

Next, the barrier coating agent is applied on the aluminum oxide deposited film by an ordinary method, and the resultant is dried. Through this drying process, polycondensation of the metal alkoxide, the silane coupling agent and the water-soluble polymer further proceeds to form a coating film. The coating operation may be repeatedly performed on the first coating film thus obtained so as to form a plurality of coating films including two or more layers.

The resultant is subjected to a heat treatment at a temperature of 20 to 200° C. and equal to or lower than a melting point of the plastic substrate, preferably a temperature in a range of 50 to 180° C., for 3 seconds to 10 minutes. In this manner, the barrier coating layer of the barrier coating agent can be formed on the aluminum oxide deposited film.

As for the composition of the barrier coating agent, 100 to 500 parts by weight of the water-soluble polymer such as the polyvinyl alcohol-based resin, and a range of 1 to 20 parts by weight of the silane coupling agent can be used with respect to 100 parts by weight of the alkoxysilane. In the composition, the silane coupling agent used in an amount exceeding 20 parts by weight is not preferred because thus, the rigidity and brittleness of the resultant barrier coating film become large.

The barrier coating layer formed as described above has a thickness of 100 to 500 nm. The thickness falling in this range is preferred because the coating film is not cracked but sufficiently covers the surface of the deposited film.

(Packaging Material)

The barrier laminate film of the present invention is good at the adhesiveness between the plastic substrate and the aluminum oxide deposited film even after a hot water treatment, particularly, a retort treatment that is a high temperature hot water treatment, and is also excellent in the gas barrier property, and hence can be suitably used for not only a retort packaging material for food and a high temperature hot water treated packaging material for medical use but also a packaging material for a content to be subjected to a retort treatment such as pet food.

In the packaging material of the present invention, at least one heat sealable layer is laminated on the barrier laminate film, a heat sealable thermoplastic resin is laminated as an innermost layer with or without an adhesive layer formed therebetween, and thus heat sealability is imparted. The packaging material can further additionally include, if necessary, in the layered structure, any of various functional layers having functions desired to be imparted to the packaging material, such as a light shielding layer for imparting a light shielding property, a printing layer for imparting decorativeness and printing, a design layer, a laser printed layer, and an absorbing/adsorbing layer for absorbing or adsorbing odor.

The heat sealable thermoplastic resin may be a resin layer, film or sheet capable of thermally melting to be mutually fused, and may be a film or sheet of, for example, low density polyethylene, intermediate density polyethylene, high density polyethylene, or straight-chain (linear) low density polyethylene.

It is preferable to use a resin containing one or more resins, such as low density polyethylene, intermediate density polyethylene, high density polyethylene, straight-chain (linear) low density polyethylene, polypropylene, polymethylpentene, polystyrene, an ethylene-vinyl acetate copolymer, an α-olefin copolymer, an ionomer resin, an ethylene-acrylic acid copolymer, an ethylene-ethyl acrylate copolymer, an ethylene-methyl methacrylate copolymer, an ethylene-propylene copolymer, and an elastomer, or a sheet obtained from a film made of these. In particular, as a layer in contact with a content such as food, it is more preferable to use a resin containing one or more olefin-based resins such as polyethylene and polypropylene, having hygiene, heat resistance, chemical resistance and an aroma retaining property, or a sheet obtained from a film of these.

The thickness is preferably about 3 to 100 μm, and more preferably about 15 to 70 μm.

(Measurement Methods for Evaluation Items)

A barrier laminate film produced under conditions described in each of examples and comparative examples described below was used as a sample to measure a transformation ratio of a transition region of a deposited film, oxygen permeability, steam permeability, and adhesion strength by the following methods.

(Transformation Ratio of Transition Region)

In the present invention, as a transformation ratio of a transition region of a deposited film, while the surface of a barrier coating layer of a barrier laminate film is being repeatedly soft etched at a constant rate using a Cs (cesium) ion gun, ions derived from the barrier coating layer, ions derived from the aluminum oxide deposited film, and ions derived from a plastic substrate are measured by the time-of-flight secondary ion mass spectrometry (TOF-SIMS), and thus, an analytic graph as illustrated in FIG. 3 is obtained. Here, a unit (intensity) on the ordinate of the graph corresponds to the measured ion intensity, and a unit (cycle) on the abscissa corresponds to the number of times of performing etching.

As a time-of-flight secondary ion mass spectrometer used in the TOF-SIMS, TOF. SIMS5 manufactured by ION TOF was used, and the measurement was performed under the following measurement conditions.

(TOF-SIMS Measurement Conditions)

Type of primary ions: $Bi_3^{++}$ (0.2 pA, 100 μs), Measurement area: 150×150 μm$^2$ Type of Et gun: Cs (1 keV, 60 nA), Et area: 600×600 μm$^2$, Et rate: 3 sec/Cycle For an ion gun used for measuring ions derived from aluminum oxide, that is, a measurement target, it is usually necessary to separate the target from ions derived from the other components among ions derived from a plurality of aluminum oxides, and it is necessary to select ions having sufficient intensity. In particular, for purpose of obtaining a depth distribution that can be approximately converted into a concentration distribution of the elemental bond $Al_2O_4H$, Cs ions were selected in the present invention.

The barrier coating layer was etched from the outermost surface by using Cs to analyze elemental bonds on the interfaces among the barrier coating layer, the aluminum oxide deposited film and the film substrate of a polyester film or the like, and elemental bonds of the deposited film, and graphs of FIG. 3 of elements and elemental bonds thus measured were obtained. In these graphs, a position where the intensity of $SiO_2$ (mass number of 59.96) corresponding to a constituent element of the barrier coating layer became a half of the barrier coating layer was first defined as an interface between the barrier coating layer and the aluminum oxide deposited film. Next, a position where the intensity of $C_6$ (mass number of 72.00) corresponding to a constituent element of the plastic substrate became a half of the layer portion was defined as an interface between the film substrate and the aluminum oxide deposited film, and a portion between the first interface and the second interface was defined as the aluminum oxide deposited film.

Next, a peak of the graph corresponding to the measured elemental bond $Al_2O_4H$ (mass number of 118.93) was obtained, and thus, a portion between the peak and the interface could be obtained as the transition region.

When a component of the barrier coating layer is constituted by a material having the same mass number as $Al_2O_4H$ (mass number of 118.93), however, it is necessary to separate a wave profile of 118.93.

In the current case, on the interface between the barrier coating layer and the aluminum oxide layer, a reaction product $AlSiO_4$ generated on the interface with the coating layer and a hydroxide $Al_2O_4H$ are generated, and hence $Al_2O_4H$ present on the film interface is separated from these. This is appropriately dealt with in accordance with the material of the barrier coating layer.

An example of a method for wave profile separation will now be described.

A profile of the mass number of 118.93 obtained by TOF-SIMS is subjected to non-linear curve fitting using Gaussian function for overlapping peak separation using the Levenberg-Marquardt algorithm by least square method.

Through these operations, the transformation ratio of the transition region of the aluminum oxide deposited film was obtained as (thickness of transition region from peak of elemental bond Al$_2$O$_4$H to interface/thickness of aluminum oxide deposited film)×100 (%).

(Oxygen Permeability)

An oxygen permeability measuring apparatus (manufactured by Modern Control Co., (MOCON), [Model Name: OX-TRAN 2/21]) was used. A composite laminate film of a barrier laminate film/adhesive/nylon film of 15 μm/adhesive/CPP of 70 μm was produced as a test sample for the measurement, the test sample was set with the film surface of the barrier laminate film formed on a side for supplying oxygen, and the measurement was performed under measurement conditions of 23° C. and 100% RH in accordance with JIS K7126 Method B.

The following measurement samples were used:

1) A composite laminate film not subjected to a retort treatment;

2) a composite laminate film obtained from one surface of a bag of the composite laminate film having been subjected to a treatment under high retort treatment conditions of 135° C. for 40 minutes; and 3) a composite laminate film obtained from one surface of a bag of the composite laminate film having been subjected to a treatment under semi retort treatment conditions of 121° C. for 40 minutes.

(Steam Permeability)

A steam permeability measuring apparatus (measuring apparatus manufactured by MOCON, [Model Name: PERMATRAN 3/33]) was used, the test sample was set with the film surface of the barrier laminate film formed on a side of a sensor, and the measurement was performed under measurement conditions of 37.8° C. and 100% RH in accordance with JIS K7126 Method B.

The following measurement samples were used:

1) A composite laminate film not subjected to a retort treatment;

2) a composite laminate film obtained from one surface of a bag of the composite laminate film having been subjected to a treatment under high retort treatment conditions of 135° C. for 40 minutes; and 3) a composite laminate film obtained from one surface of a bag of the composite laminate film having been subjected to a treatment under semi retort treatment conditions of 121° C. for 40 minutes.

(Adhesion Strength Between Substrate and Aluminum Oxide Deposited Film)

<Measurement (1) of Adhesion Strength: Adhesion Strength before High Retort/Semi Retort Treatment>

A multilayer composite film was produced by dry-laminating a film, which was obtained by applying a two-component curing type polyurethane-based adhesive on a barrier coating layer side of a barrier laminate film and drying the resultant, and a film, which was obtained by adhering a two-component curing type polyurethane-based adhesiveness and a stretched nylon film having a thickness of 15 μm to an unstretched polypropylene film having a thickness of 70 μm.

The thus obtained multilayer composite film was subjected to an aging treatment for 48 hours, and the resultant was cut into a strip having a width of 15 mm to be used as a sample. The sample was measured for strength between the barrier laminate film substrate and the aluminum oxide deposited film using a tensile testing machine (manufactured by Orientec Co., Ltd., [Model Name: TENSILON Universal Testing Machine]) in accordance with JIS K6854-2.

For the measurement, a polypropylene film side and a barrier laminate film side of the sample, which were precedently peeled for the measurement, were grasped with grippers of the measurement apparatus, and were pulled in opposite directions in a direction perpendicular to a plane direction of a portion where the polypropylene film and the barrier laminate film were still laminated (180° peeling: T-shaped peeling) at a speed of 50 mm/min, and thus, an average of tensile stresses in a stability region was measured.

The peeling was caused between the plastic substrate and the aluminum oxide deposited film of the barrier laminate film, where adhesion strength is the weakest in the multilayer composite film, and the measured value obtained as described above was defined as the adhesion strength between the plastic substrate and the aluminum oxide deposited film of the barrier laminate film.

<Measurement (2) of Adhesion Strength: Adhesion Strength after High Retort Treatment>

A multilayer composite film was produced by dry-laminating a film, which was obtained by applying a two-component curing type polyurethane-based adhesive on a barrier coating layer side of a barrier laminate film and drying the resultant, and a film, which was obtained by adhering a two-component curing type polyurethane-based adhesiveness and a stretched nylon film having a thickness of 15 μm to an unstretched polypropylene having a thickness of 70 μm.

Into a four-side pouch produced in a B5 paper size from the multilayer composite film, 100 mL of water was poured, and the resultant was subjected to hot water retort treatment at 135° C. for 40 minutes. After the retort treatment, the four-side pouch, from which the water had been removed, was cut into a strip having a width of 15 mm to prepare a sample. The sample was used for measuring adhesion strength in the same manner as in Measurement (1) of Adhesion Strength.

<Measurement (3) of Adhesion Strength: Adhesion Strength after Semi Retort Treatment>

In the structure described in Measurement (2) of Adhesion Strength, the nylon film was not used, and the thickness of the polypropylene film was changed to 70 μm, and thus, a multilayer composite film was produced.

Into a four-side pouch produced in a B5 paper size from the multilayer composite film, 100 mL of water was poured, and the resultant was subjected to hot water retort treatment at 121° C. for 40 minutes. After the retort treatment, the four-side pouch, from which the water had been removed, was cut into a strip having a width of 15 mm to prepare a sample. The sample was used for measuring adhesion strength in the same manner as in Measurement (1) of Adhesion Strength.

EXAMPLES

Experiment I

Example 1

<Formation of Aluminum Oxide Deposited Film>

First, a roll around which a petroleum-derived polyethylene terephthalate film (hereinafter referred to as the PET film) having a thickness of 12 μm to be used as a plastic substrate was wound was prepared.

Next, a continuous deposited film forming apparatus in which a pretreatment section including an oxygen plasma pretreatment apparatus and a film forming section were separated from each other was used to introduce, onto a surface of the PET film on which a deposited film was to be provided, plasma from a plasma supply nozzle in the pretreatment section under conditions described below to perform an oxygen plasma pretreatment at a conveyance speed of 400 m/min. In the film forming section to which the PET film was continuously conveyed, an aluminum oxide deposited film having a thickness of 12 nm was formed on the resultant oxygen plasma treated surface on the PET film by a reactive resistance heating method used as heating means by a vacuum deposition method under conditions described below.

(Conditions for Oxygen Plasma Pretreatment)
  Plasma intensity: 200 W·sec/m$^2$
  Ratio of plasma forming gasses: oxygen/argon=2/1
  Voltage applied between pretreatment drum and plasma supply nozzle: 340 V
  Degree of vacuum in pretreatment section: 3.8 Pa
(Conditions for Aluminum Oxide Film Formation)
  Degree of vacuum: $8.1 \times 10^{-2}$ Pa
  Conveyance speed: 400 m/min
  Oxygen gas supply amount: 20000 sccm <Formation of Barrier Coating Layer>

To a solution obtained by mixing 385 g of water, 67 g of isopropyl alcohol and 9.1 g of 0.5 N hydrochloric acid, and adjusting the resultant to pH 2.2, 175 g of tetraethoxysilane used as a metal alkoxide and 9.2 g of glycidoxypropyltrimethoxysilane used as a silane coupling agent were added while cooling to 10° C., and thus, a solution A was prepared.

A solution B was prepared as a water-soluble polymer by mixing 14.7 g of polyvinyl alcohol having a saponification degree of 99% or more and a polymerization degree of 2400, 324 g of water and 17 g of isopropyl alcohol.

A solution obtained by mixing the solution A and the solution B in a weight ratio of 6.5:3.5 was used as a barrier coating agent.

The barrier coating agent prepared as described above was coated by spin coating on the aluminum oxide deposited film of the PET film.

Thereafter, the resultant was heated in an oven at 180° C. for 60 seconds to form a barrier coating layer having a thickness of about 400 nm on the aluminum oxide deposited film, and thus, a barrier laminate film was obtained.

Example 2

A barrier laminate film was obtained in the same manner as in Example 1 except that the condition for the oxygen plasma pretreatment was changed to 100 W·sec/m$^2$.

Example 3

A barrier laminate film was obtained in the same manner as in Example 1 except that a biomass-derived PET film having a thickness of 12 μm was used as the plastic substrate and that the condition for the plasma pretreatment was changed to 150 W·sec/m$^2$.

Example 4

A barrier laminate film was obtained in the same manner as in Example 1 except that a petroleum-derived polybutylene terephthalate film (hereinafter referred to as the PBT film) having a thickness of 12 μm was used as the plastic substrate, that the thickness of the aluminum oxide deposited film was changed to 10 nm, and that the condition for the oxygen plasma pretreatment was changed to 150 W·sec/m$^2$.

As a retort condition, however, semi retort condition was employed.

Example 5

A barrier laminate film was obtained in the same manner as in Example 1 except that a petroleum-derived PET film having a thickness of 12 μm in which a moisture content had been increased through long-term storage at high humidity was used, and that the thickness of the aluminum oxide deposited film was changed to 14 nm.

Comparative Example 1

A barrier laminate film was obtained in the same manner as in Example 1 except that the thickness of the aluminum oxide deposited film was changed to 7 nm.

Comparative Example 2

A barrier laminate film was obtained in the same manner as in Example 1 except that the oxygen plasma pretreatment was not performed.

Measurement results are shown in Table 1. As shown as the results of Examples 1 to 4, a barrier laminate film having the transformation ratio of the transition region of the aluminum oxide deposited film of the present invention of 5% or more and 60% or less exhibited good oxygen permeability and steam permeability even after the retort treatment, and also exhibited good adhesiveness.

In Comparative Examples 1 and 2, the peak of the elemental bond $Al_2O_4H$ was so low that the peak was hidden on a side of the substrate interface and hence could not be separated, and therefore, the transformation ratio of the transition region could not be calculated (a numerical value equal to or smaller than 0%).

In addition, in Comparative Examples 1 and 2, the steam barrier property after the retort treatment was poor, and delamination occurred due to rapid deterioration of peel strength.

TABLE 1

| | | | | Example | | | | | Comparative Example | |
|---|---|---|---|---|---|---|---|---|---|---|
| | | | unit | 1 | 2 | 3 | 4 | 5 | 1 | 2 |
| Conditions | Plastic Substrate | Resin Type | — | PET | PET | PET | PBT | PET | PET | PET |
| | | Derivation | — | Petroleum | Petroleum | Biomass | Petroleum | Petroleum | Petroleum | Petroleum |
| | | Moisture Content | — | normal | normal | normal | normal | high | normal | normal |
| | Oxygen Plasma Intensity | | W·sec/m$^2$ | 200 | 100 | 150 | 150 | 200 | 200 | not performed |
| | Thickness of Aluminum Oxide Deposited Film | | nm | 12 | 12 | 12 | 10 | 14 | 7 | 12 |

TABLE 1-continued

| | | unit | Example 1 | Example 2 | Example 3 | Example 4 | Example 5 | Comparative Example 1 | Comparative Example 2 |
|---|---|---|---|---|---|---|---|---|---|
| Evaluation Results | Transformation Ratio of Transition Region | % | 17.3 | 12.5 | 19.6 | 26.3 | 55.8 | not calculable | not calculable |
| | Oxygen Permeability | before high retort treatment | $cc/m^2/$ 24 hr/atm | 0.2 | 0.2 | 0.3 | 0.3 | 02 | 0.5 |
| | | after high retort treatment | $cc/m^2/$ 24 hr/atm | 0.2 | 0.2 | 0.3 | 0.3* | 0.2 | 0.5 |
| | Steam Permeability | before high retort treatment | $g/m^2/$ 24 hr | 0.4 | 0.4 | 0.3 | 0.3 | 0.4 | 1.5 |
| | | after high retort treatment | $g/m^2/$ 24 hr | 0.5 | 0.5 | 0.6 | 0.8* | 0.5 | 1.2 |
| | Adhesiveness | | — | good | good | good | good | good | peeled | note)
Each numerical value with * of Example 4 is a value obtained in performing a semi retort treatment.

Experiment II

In Experiment II, a film forming apparatus 60 illustrated in FIG. 10 was used to form an aluminum oxide deposited film.

Example A1

As a plastic substrate 1, a high stiffness PET film having loop stiffness of 0.0017 N/15 mm or more and made of petroleum-derived PET was prepared. Specifically, as the high stiffness PET film, XP-55 manufactured by Toray Industries, Inc. was used. The high stiffness PET film had a thickness of 16 μm. Besides, a measured value of the loop stiffness of the high stiffness PET film was 0.0021 N/15 mm in both the flow direction and vertical direction. Besides, a Young's modulus in the flow direction of the high stiffness PET film was 4.8 GPa, and a Young's modulus in the vertical direction of the high stiffness PET film was 4.7 GPa.

Tensile strength in the flow direction of the high stiffness PET film was 292 MPa, and tensile strength in the vertical direction of the high stiffness PET film was 257 MPa. Tensile elongation in the flow direction of the high stiffness PET film was 107%, and tensile elongation in the vertical direction of the high stiffness PET film was 102%. In this case, a value obtained by dividing the tensile strength in the flow direction of the high stiffness PET film by the tensile elongation is 2.73 [MPa/%], and a value obtained by dividing the tensile strength in the vertical direction of the high stiffness PET film by the tensile elongation is 2.52 [MPa/%]

Besides, thermal shrinkage factors of the high stiffness PET film in the flow direction and the vertical direction were both 0.4%.

Subsequently, piercing strength of the high stiffness PET film was measured in accordance with JIS Z1707 7.4. As a measuring device, TENSILON Universal Testing Machine RTC-1310 manufactured by A & D Co., Ltd. was used. Specifically, a test piece of the high stiffness PET film in a fixed state was pierced, from a side of an outer surface 30y, with a semi-circular needle having a diameter of 1.0 mm and a radius at a tip of 0.5 mm at a speed of 50 mm/min (50 mm per minute), and a maximum value of stress for penetrating through the high stiffness PET film with the needle was measured. The maximum value of the stress was measured in five or more test pieces, and an average of the thus measured values was defined as the piercing strength of the high stiffness PET film. The measurement was performed in an environment of a temperature of 23° C. and a relative humidity of 50%. As a result, the piercing strength was 10.2 N.

Example B1

An example of a barrier laminate film A produced by forming an aluminum oxide deposited film 2 on a plastic substrate 1 and forming a barrier coating layer 3 on the aluminum oxide deposited film 2 will be described.

First, as the plastic substrate 1, a roll around which the high stiffness PET film having a thickness of 16 μm used in Example A1 above was wound was prepared. Subsequently, the film forming apparatus 60 illustrated in FIG. 10 was used to perform the oxygen plasma treatment on the plastic substrate 1, and then, the aluminum oxide deposited film 2 containing aluminum oxide and having a thickness of 12 nm was formed on the oxygen plasma pretreated surface. Hereinafter, the oxygen plasma pretreatment and the film forming treatment will be described in detail.

In the oxygen plasma pretreatment, plasma was introduced onto the surface of the plastic substrate 1, on which the aluminum oxide deposited film 2 was to be formed, from plasma supply nozzles 72 in a plasma pretreatment chamber 62B under conditions described below, and thus, the plastic substrate 1 conveyed at a conveyance speed of 400 m/min was subjected to the plasma pretreatment. As a result, an oxygen plasma treated surface was formed on the surface of the plastic substrate 1 on which the aluminum oxide deposited film 2 was to be formed.

[Conditions for Oxygen Plasma Pretreatment]
Plasma intensity: 200 W·sec/m$^2$
Ratio of plasma forming gasses: oxygen/argon=2/1
Voltage applied between pretreatment drum and plasma supply nozzle: 340 V
Degree of vacuum in pretreatment section: 3.8 Pa In the film forming treatment, in a film forming chamber 62C to which the plastic substrate 1 was continuously conveyed from the plasma pretreatment chamber 62B, aluminum was used as a target to form, on the oxygen plasma treated surface of the plastic substrate 1, the aluminum oxide deposited film 2 containing aluminum oxide and having a thickness of 12 nm by a vacuum deposition method. As heating means of the vacuum deposition method, the reactive resistance heating method was employed. Conditions for the film formation were as follows:
[Conditions for Aluminum Oxide Film Formation]
Degree of vacuum: $8.1 \times 10^{-2}$ Pa
Conveyance speed: 400 m/min
Oxygen gas supply amount: 20000 sccm Subsequently, the barrier coating layer 3 was formed on the aluminum oxide deposited film 2. Specifically, to a solution obtained by mixing 385 g of water, 67 g of isopropyl alcohol and 9.1 g of 0.5 N hydrochloric acid, and adjusting the resultant to pH 2.2, 175 g of tetraethoxysilane used as a metal alkoxide and 9.2 g of glycidoxypropyltrimethoxysilane used as a silane coupling agent were added while cooling to 10° C., and thus, a solution A was prepared.

A solution B was prepared as a water-soluble polymer by mixing 14.7 g of polyvinyl alcohol having a saponification degree of 99% or more and a polymerization degree of 2400, 324 g of water and 17 g of isopropyl alcohol.

Subsequently, the solution A and the solution B were mixed in a weight ratio of 6.5:3.5. The thus obtained solution was used as a coating agent for a gas barrier coating film.

The coating agent for a gas barrier coating film prepared as described above was coated by spin coating on the aluminum oxide deposited film 2. Thereafter, the resultant was heated in an oven at 180° C. for 60 seconds to form the barrier coating layer 3 having a thickness of about 400 nm on the aluminum oxide deposited film 2. In this manner, the barrier laminate film A including the plastic substrate 1, the aluminum oxide deposited film 2 and the barrier coating layer 3 was obtained.

The barrier laminate film A of Example B1 was measured for the transformation ratio, the oxygen permeability, the steam permeability and the loop stiffness.

(Transformation Ratio)

In an evacuated environment, while the surface of the barrier coating layer 3 of the barrier laminate film A was being repeatedly soft etched at a constant rate using a Cs (cesium) ion gun, ions derived from the barrier coating layer 3, ions derived from the aluminum oxide deposited film 2, and ions derived from the plastic substrate 1 were measured by time-of-flight secondary ion mass spectrometry (TOF-SIMS). For example, mass spectrometry of ions of $C_6$ (mass number of 72.00) derived from the resin film of the plastic substrate 1 and $Al_2O_4H$ (mass number of 118.93) derived from the aluminum oxide deposited film 2 was performed.

As a time-of-flight secondary ion mass spectrometer used in TOF-SIMS, TOF. SIMS5 manufactured by ION TOF was used, and the measurement was performed under the following measurement conditions. Thus, a graph as illustrated in FIG. 3 was obtained.

(TOF-SIMS Measurement Conditions)
Type of primary ions: $Bi_3^{++}$ (0.2 pA, 100 µs)
Measurement area: 150×150 µm²
Type of etching gun: Cs (1 keV, 60 nA)
Etching area: 600×600 µm²
Etching Et rate: 3 sec/cycle
Evacuation time: 15 hours or more at $1 \times 10^{-6}$ mbar or less The measurement using the time-of-flight secondary ion mass spectrometer was performed within 30 hours after starting the evacuation.

In the graph, a position where the intensity of $SiO_2$ (mass number of 59.96) corresponding to a constituent element of the barrier coating layer 3 became a half of the intensity in the barrier coating layer 3 was defined as an interface between the barrier coating layer 3 and the aluminum oxide deposited film 2. Besides, a position where the intensity of $C_6$ (mass number of 72.00) corresponding to a constituent element of the plastic substrate 1 became a half of the intensity in the plastic substrate 1 was defined as an interface between the plastic substrate 1 and the aluminum oxide deposited film 2. Furthermore, a distance in the thickness direction between these two interfaces was employed as a thickness of the aluminum oxide deposited film 2.

Next, a peak corresponding to the measured elemental bond $Al_2O_4H$ (mass number of 118.93) was obtained, and a portion between the peak and the interface was defined as the transition region. When a component of the barrier coating layer 3 is constituted by a material having the same mass number as $Al_2O_4H$ (mass number of 118.93), however, it is necessary to separate a wave profile of 118.93.

When a reaction product $AlSiO_4$ and a hydroxide $Al_2O_4H$ are generated on the interface between the barrier coating layer 3 and the aluminum oxide deposited film 2, $Al_2O_4H$ present on the interface between the plastic substrate 1 and the aluminum oxide deposited film 2 can be separated from these. Thus, the wave profile separation can be appropriately coped with in accordance with the material of the barrier coating layer 3.

In the wave profile separation, for example, a profile of the mass number of 118.93 obtained by TOF-SIMS may be subjected to non-linear curve fitting using Gaussian function for overlapping peak separation using the Levenberg-Marquardt algorithm by least square method.

Two samples were prepared from the barrier laminate film A of Example B1, and the transformation ratio of the aluminum oxide deposited film 2 of each of the two samples was calculated as (thickness W1 of transition region/thickness of aluminum oxide deposited film 2)×100(%). As a result, the transformation ratio of the first sample was 36.2%, and the transformation ratio of the second sample was 28.8%.

(Loop Stiffness)

Besides, the aforementioned rectangular test piece 40 was prepared from the barrier laminate film A of Example B1 for measuring the loop stiffness in the flow direction and the vertical direction. As a measuring device, No. 581 LOOP STIFFNESS TESTER(R) DA manufactured by Toyo Seiki Seisaku-sho, Ltd. was used. The measurement was performed in an environment of a temperature of 23° C. and a relative humidity of 50%. As a result, the loop stiffness in the flow direction of the barrier laminate film A was 0.0021 N, and the loop stiffness in the vertical direction was 0.0021 N.

(Oxygen Permeability)

The barrier laminate film A prepared as described above and an unstretched polypropylene film (CPP film) having a thickness of 60 µm were adhered to each other by a dry laminating method with a two-component curing type polyurethane-based adhesive to produce a packaging material 8. As the CPP film, an unstretched polypropylene film ZK207 manufactured by Toray Advanced Film Co., Ltd. was used.

Subsequently, the packaging material 8 was subjected to an aging treatment for 48 hours, and a sample to be used for evaluation of oxygen permeability before a retort treatment was prepared from the packaging material 8.

Besides, a four-side sealed pouch in a B5 paper size was prepared from the packaging material 8. Subsequently, 100 mL of water was poured through an upper opening of the four-side sealed pouch, and a sealing portion was formed in the upper portion to seal the four-side sealed pouch. Then, the resultant four-side sealed pouch was subjected to a retort treatment at 121° C. for 40 minutes.

Subsequently, the packaging material 8 constituting one surface of the four-side sealed pouch having been subjected to the retort treatment was cut to prepare a sample to be used for evaluation of oxygen permeability after the retort treatment.

Subsequently, each of the sample obtained before the retort treatment and the sample obtained after the retort treatment was set with the plastic substrate 1 formed on a side for supplying oxygen, and oxygen permeability was measured under measurement conditions of 23° C. and 100% RH atmosphere in accordance with JIS K7126 Method B. As a measuring device, an oxygen permeability measuring apparatus (manufactured by Modern Control Co., (MOCON), [Model Name: OX-TRAN 2/21]) was used. As a result, the oxygen permeability of the sample obtained before the retort treatment was 0.24 cc/m$^2$/24 hr/atm. Besides, the oxygen permeability of the sample obtained after the retort treatment was 0.20 cc/m$^2$/24 hr/atm. In this manner, in both the states before and after the retort treatments, the oxygen permeability could be less than 0.50 cc/m$^2$/24 hr/atm.

(Steam Permeability)

The steam permeability was measured by using the same samples as those used in the measurement of the oxygen permeability. Specifically, each sample was set with the plastic substrate 1 formed on a side of a sensor, the steam permeability was measured under measurement conditions of 37.8° C. and 100% RH atmosphere in accordance with JIS K7126 Method B. As a measuring device, a steam permeability measuring apparatus (measuring apparatus manufactured by MOCON, [Model Name: PERMATRAN 3/33]) was used. As a result, the steam permeability of the sample obtained before the retort treatment was 0.61 g/m$^2$/24 hr. Besides, the steam permeability of the sample obtained after the retort treatment was 1.05 g/m$^2$/24 hr. In this manner, in both the states before and after the retort treatments, the steam permeability could be less than 1.5 g/m$^2$/24 hr.

Example B2

A barrier laminate film A including a plastic substrate 1 and an aluminum oxide deposited film 2 provided on the plastic substrate 1 was produced in the same manner as in Example B1 except that the barrier coating layer 3 was not formed on the aluminum oxide deposited film 2. Subsequently, in the same manner as in Example B1, two samples were prepared from the barrier laminate film A of Example B2, and the transformation ratio of the aluminum oxide deposited film 2 of each of the two samples was calculated as (thickness W1 of transition region/thickness of aluminum oxide deposited film 2)×100 (%). As a result, the transformation ratio of the first sample was 37.8%, and the transformation ratio of the second sample was 42.2%.

Besides, the above-described rectangular test piece 40 was prepared from the barrier laminate film A of Example B2, and the loop stiffness in the flow direction and the vertical direction was measured in the same manner as in Example B1. As a result, the loop stiffness in the flow direction of the barrier laminate film A was 0.0021N, and the loop stiffness in the vertical direction was 0.0021 N.

Comparative Example B1

A barrier laminate film A including a plastic substrate 1, an aluminum oxide deposited film 2 provided on the plastic substrate 1, and a barrier coating layer 3 provided on the aluminum oxide deposited film 2 was produced in the same manner as in Example B1 except that a biaxially stretched PET film having loop stiffness less than 0.0017 N in both the flow direction and the vertical direction, and made of petroleum-derived PET was used as the plastic substrate 1. Subsequently, in the same manner as in Example B1, the above-described rectangular test piece 40 was prepared from the barrier laminate film A of Comparative Example B1 to measure the loop stiffness in the flow direction and the vertical direction. As a result, the loop stiffness in the flow direction of the barrier laminate film A was 0.0014 N, and the loop stiffness in the vertical direction was 0.0016 N.

INDUSTRIAL APPLICABILITY

According to the present invention, improved adhesiveness can be attained by properly setting a transformation ratio of a transition region of an aluminum oxide deposited film formed between the deposited film and a plastic substrate, and thus, a barrier laminate film including an aluminum oxide deposited film having a barrier property can be obtained.

When deterioration, caused through a retort treatment, of adhesion strength between the deposited film and the plastic substrate is improved, a barrier laminate film having a barrier property inhibiting permeation of an oxygen gas, steam and the like, and having adhesiveness can be obtained, and this film is applicable to, for example, a packaging material for food or drugs requiring a laminated material resistant to a treatment, such as a retort treatment or disinfection, performed in processing, and industrial materials used in the fields of severe use environments requiring durability and a barrier property, such as a packaging or protecting sheet for an electric/electronic component.

REFERENCE SIGNS LIST

1, S plastic substrate
2 aluminum oxide deposited film
3 barrier coating layer
8 packaging material
A barrier laminate film
P plasma
10 roller type continuous deposited film-forming apparatus
12 decompression chamber
12A substrate conveyance chamber
12B plasma pretreatment chamber
12C film forming chamber
14a to 14d guide roll
18 material volatile supplying device
20 pretreatment roller
21 magnet
22 plasma supply nozzle
23 film forming roller
24 deposited film forming means
31 power supply line
32 power supply
35a to 35c partition wall
60 film forming apparatus
62 decompression chamber
62A substrate conveyance chamber
62B plasma pretreatment chamber
62C film forming chamber
63 unwind roller
64 guide roller
65 take-up roller
68 material volatile supplying device
69 material gas supply nozzle
70 plasma pretreatment roller 71 electrode
72 plasma supply nozzle
75 film forming roller
76 film forming means
80 vacuum pump
8 power supply line
82 power supply
85a to 85c partition wall

The invention claimed is:

1. A barrier laminate film, having, after a high retort treatment at 135° C. for 40 minutes:
   (i) an oxygen permeability of 0.3 cc/m²/24 hr/atm or less, and
   (ii) a steam permeability of 0.6 g/m²/24 hr,
   the barrier laminate film comprising an aluminum oxide deposited film containing aluminum oxide as a principal component and formed on a surface of a plastic substrate, and a barrier coating layer formed on a surface of the aluminum oxide deposited film,
   wherein
   the plastic substrate is a high stiffness polyethylene terephthalate (high stiffness PET) film or a film of a resin selected from the group consisting of:
   a polyethylene terephthalate (PET);
   a recycled polyethylene terephthalate (recycled PET); and
   a biomass-derived polyethylene terephthalate (PET),
   the surface of the plastic substrate is an oxygen plasma treated surface, the oxygen plasma treatment using a mixed gas of oxygen gas/inert gas with a mixed ratio of 5/2 to 1/1 under a magnetic flux density of 10 Gauss (G) to 10000 G, a plasma intensity of 50 W·sec/m² to 1000 W·sec/m², a pretreatment pressure of 1 to 20 Pa, and a pretreatment conveyance speed of 300 to 800 meters per minute;
   the aluminum oxide deposited film is an oxidated physical vapor deposition film of aluminum vapor;
   a thickness of the aluminum oxide deposited film is in a range from 10 nm to 50 nm;
   a transition region regulating adhesion strength between the surface of the plastic substrate and the aluminum oxide deposited film is formed in the aluminum oxide deposited film,
   the transition region contains an elemental bond $Al_2O_4H$ detectable by etching by time-of-flight secondary ion mass spectrometry (TOF-SIMS) and transformed to aluminum hydroxide, and
   a transformation ratio of the transition region defined as a ratio of a thickness of a transformed portion of the transition region regulated by TOF-SIMS to a thickness of the aluminum oxide deposited film regulated by etching the barrier coating layer and the aluminum oxide deposited film by TOF-SIMS is 5% or more and 60% or less.

2. The barrier laminate film according to claim 1, wherein the plastic substrate is the PET film.

3. The barrier laminate film according to claim 2, wherein the aluminum oxide deposited film is an in-line aluminum oxide deposited film laminated on the oxygen plasma treated surface.

4. The barrier laminate film according to claim 1, wherein the plastic substrate contains the recycled PET film.

5. The barrier laminate film according to claim 4, wherein the aluminum oxide deposited film is an in-line aluminum oxide deposited film laminated on the oxygen plasma treated surface.

6. The barrier laminate film according to claim 1, wherein the plastic substrate is the biomass-derived PET film.

7. The barrier laminate film according to claim 6, wherein the aluminum oxide deposited film is an in-line aluminum oxide deposited film laminated on the oxygen plasma treated surface.

8. The barrier laminate film according to claim 1, wherein the plastic substrate is the high stiffness PET film.

9. The barrier laminate film according to claim 8, wherein the aluminum oxide deposited film is an in-line aluminum oxide deposited film laminated on the oxygen plasma treated surface.

10. The barrier laminate film according to claim 1, wherein the aluminum oxide deposited film is an in-line aluminum oxide deposited film laminated on the oxygen plasma treated surface.

11. The barrier laminate film according to claim 1, wherein the barrier coating layer is a layer formed by applying a mixed solution of a metal alkoxide and a water-soluble polymer, and drying the applied solution by heating.

12. The barrier laminate film according to claim 1, wherein the barrier coating layer is a layer formed by applying a mixed solution of a metal alkoxide, a silane coupling agent and a water-soluble polymer, and drying the applied solution by heating.

13. A packaging material, comprising the barrier laminate film according to claim 1, and a heat-sealable thermoplastic resin laminated on the barrier laminate film.

14. The packaging material according to claim 13, used for packaging for retort sterilization.

15. A production method to produce a barrier laminate film having, after a high retort treatment at 135° C. for 40 minutes:
   (i) an oxygen permeability of 0.3 cc/m²/24 hr/atm or less, and
   (ii) a steam permeability of 0.6 g/m²/24 hr,
   the barrier laminate film containing aluminum oxide as a principal component and formed on a surface of a plastic substrate, and a barrier coating layer formed on a surface of the aluminum oxide deposited film, comprising:
   subjecting the surface of the plastic substrate to an oxygen plasma treatment using a mixed gas of oxygen gas/inert gas with a mixed ratio of 5/2 to 1/1 under a magnetic flux density of 10 Gauss (G) to 10000 G, a plasma intensity of 50 W·sec/m² to 1000 W·sec/m², a pretreatment pressure of 1 to 20 Pa, and a pretreatment conveyance speed of 300 to 800 meters per minute, wherein the plastic substrate is a high stiffness polyethylene terephthalate (high stiffness PET) film or a film of a resin selected from a group consisting of:
   a polyethylene terephthalate (PET);
   a recycled polyethylene terephthalate (recycled PET); and
   a biomass-derived polyethylene terephthalate (PET), and
   forming an aluminum oxide vapor deposition film on the surface of the plastic substrate with a thickness of 10-50 nm by a physical vapor deposition method using an aluminum metal as a vapor source and oxidizing aluminum vapor by supplying oxygen,
   wherein a transition region regulating adhesion strength between the surface of the plastic substrate and the aluminum oxide deposited film is formed in the aluminum oxide deposited film, the transition region contains an elemental bond $Al_2O_4H$ detectable by etching by time-of-flight secondary ion mass spectrometry (TOF-SIMS) and transformed to aluminum hydroxide, and a transformation ratio of the transition region defined as a ratio of a thickness of a transformed portion of the transition region regulated by TOF-SIMS to a thickness of the aluminum oxide deposited film regulated by etching the barrier coating layer and the aluminum oxide deposited film by TOF-SIMS is 5% or more and 60% or less.

16. The production method of claim 15, wherein the aluminum oxide deposited film is laminated in-line on the oxygen plasma treated surface.

17. A barrier laminate film produced by the method of claim 16.

18. A barrier laminate film produced by the method of claim 15.

* * * * *